United States Patent
Miller et al.

(10) Patent No.: US 10,611,043 B2
(45) Date of Patent: Apr. 7, 2020

(54) METHOD AND MACHINE FOR MAKING UNIFORM PRODUCTS

(71) Applicant: ALTRIA CLIENT SERVICES LLC, Richmond, VA (US)

(72) Inventors: Carl Gregory Miller, Richmond, VA (US); Charles Lester Dendy, Ruther Glen, VA (US); Jeremy J. Straight, Midlothian, VA (US); Gregory James Griscik, Midlothian, VA (US)

(73) Assignee: Altria Client Services LLC, Richmond, VA (US)

( * ) Notice: Subject to any disclaimer, the term of this patent is extended or adjusted under 35 U.S.C. 154(b) by 609 days.

(21) Appl. No.: 14/206,667

(22) Filed: Mar. 12, 2014

(65) Prior Publication Data
US 2014/0262683 A1 Sep. 18, 2014

Related U.S. Application Data

(60) Provisional application No. 61/791,337, filed on Mar. 15, 2013.

(51) Int. Cl.
*B26D 7/06* (2006.01)
*B65G 17/30* (2006.01)
(Continued)

(52) U.S. Cl.
CPC ......... *B26D 7/0683* (2013.01); *A23G 3/0046* (2013.01); *A23G 3/06* (2013.01);
(Continued)

(58) Field of Classification Search
CPC ............. Y10T 83/0448; Y10T 83/0467; Y10T 83/145; Y10T 83/202; Y10T 83/2209;
(Continued)

(56) References Cited

U.S. PATENT DOCUMENTS 3,083,432 A 4/1963 Hely
3,092,157 A * 6/1963 Lasar ............... B23D 55/04
83/421

(Continued)

FOREIGN PATENT DOCUMENTS

DE 2736128 3/1978
EP 1 243 386 9/2002
(Continued)

OTHER PUBLICATIONS

International Preliminary Report on Patentability in International Application No. PCT/US2014/024726, dated Sep. 24, 2015, 7 pages.

(Continued)

*Primary Examiner* — Phong H Nguyen
(74) *Attorney, Agent, or Firm* — Harness, Dickey & Pierce, P.L.C.

(57) ABSTRACT

A method of forming an oral product includes gripping a rod of oral product material with a gripping device, indexing the rod forward to have a leading end of the rod abut a stop at a first location, cutting a leading portion of the rod to create an oral product, moving the stop to a second location to allow the oral product to fall, moving the stop back to the first location, and repeating the process. A machine for forming an oral product can include a cutting device adapted to cut through a rod of plastic material, a stop spaced from the cutting device, the stop being adapted to be moved from a first location to a second location, a gripping device adapted to hold and index a rod towards the stop, and a load cell positioned to receive oral products cut from a rod by the cutting device.

27 Claims, 19 Drawing Sheets

(51) Int. Cl.
    *B26D 1/08*     (2006.01)
    *A23G 7/00*     (2006.01)
    *B26D 7/18*     (2006.01)
    *A23G 3/34*     (2006.01)
    *A23G 3/06*     (2006.01)
    *B26D 7/30*     (2006.01)
    *A23G 4/04*     (2006.01)

(52) U.S. Cl.
    CPC ............ *A23G 7/0018* (2013.01); *B26D 1/08* (2013.01); *B26D 7/0633* (2013.01); *B26D 7/1854* (2013.01); *B26D 7/30* (2013.01); *B65G 17/30* (2013.01); *A23G 4/04* (2013.01)

(58) Field of Classification Search
    CPC ............ Y10T 83/2213; Y10T 83/2196; Y10T 83/444; Y10T 83/445; Y10T 83/4544; Y10T 83/4546; Y10T 83/463; Y10T 83/4632; Y10T 83/485; Y10T 83/494; Y10T 83/50; Y10T 83/5815; Y10T 83/5842; Y10T 83/6491; Y10T 83/748; Y10T 83/8821; Y10T 83/8825; Y10T 83/182; Y10T 83/162; Y10T 83/081; Y10T 83/083; Y10T 83/086; Y10T 83/094; Y10S 83/932; B65G 17/30; B26D 7/30; B26D 7/1854; B26D 7/0633; B26D 7/0683; B26D 1/08; A23G 7/0018; A23G 3/0046; A23G 3/06; A23G 4/04; G05B 19/00
See application file for complete search history.

(56) References Cited

U.S. PATENT DOCUMENTS

| | | | |
|---|---|---|---|
| 4,217,650 A | | 8/1980 | Kuchler |
| 4,445,409 A | * | 5/1984 | Mohr .................. B26D 7/18 83/157 |
| 5,088,364 A | | 2/1992 | Stolzer |
| 5,209,149 A | * | 5/1993 | Mohr ................. B26D 7/015 83/157 |
| 5,214,992 A | * | 6/1993 | Mohr ................. B26D 7/015 83/157 |
| 5,224,407 A | * | 7/1993 | Koch ................... B26D 7/01 83/42 |
| 5,395,575 A | | 3/1995 | Stribbell et al. |
| 6,524,090 B1 | * | 2/2003 | Hayashi ................ A21C 3/02 425/140 |
| 7,055,419 B2 | | 6/2006 | Sandberg |
| 2009/0029018 A1 | | 1/2009 | Elejalde et al. |
| 2011/0147280 A1 | * | 6/2011 | Vicherat ................ A61J 3/07 209/645 |

FOREIGN PATENT DOCUMENTS

| | | |
|---|---|---|
| GB | 243903 | 12/1925 |
| GB | 302533 | 12/1928 |
| GB | 691878 | 5/1953 |
| WO | WO 2007/130915 | 11/2007 |

OTHER PUBLICATIONS

International Search Report and Written Opinion in International Application No. PCT/US2014/024726, dated Jul. 15, 2014, 11 pages.

\* cited by examiner

410A

410B

410C

410D

410E

410F

METHOD AND MACHINE FOR MAKING UNIFORM PRODUCTS

CROSS REFERENCE TO RELATED APPLICATIONS

This application claims the benefit of priority under 35 U.S.C. § 119(e) to U.S. Application No. 61/791,337 filed Mar. 15, 2013. The prior application is incorporated herein by reference in its entirety.

TECHNICAL FIELD

This document relates to methods and machines for making uniform products.

BACKGROUND

Oral products providing flavor and/or one or more active ingredients are well known. One such oral product is chewing gum (e.g., nicotine gum). Other oral products include hard candies (e.g., mints). Softer gelatin-based oral products are also known. Pharmaceutical and therapeutic products (e.g., cough-suppressant lozenges) can also be provided in a solid form for oral consumption. Smokeless tobacco products can also be provided in a number of different forms.

Having consistent product weights can be important for product safety reasons and/or for labeling requirements. Having consistent dimensions can also improve the appeal of manufactured products. A checkweigher can be used to make sure that a product is of a desired weight. A checkweigher is an automatic machine for checking the weight of a product or a packaged commodity. It is normally found at the offgoing end of a production process and is used to ensure that the weight of a product or package is within specified limits. Any products or packages that are outside the tolerance are taken out of line automatically. Having a process that consistently forms products of a consistent size and/or weight can reduce costs and by eliminating the production of reject products.

SUMMARY

This specification provides methods and machines for forming oral products. In particular, the method can include gripping a rod of oral product material with a gripping device, indexing the rod forward to have a leading end of the rod abut a stop at a first location, cutting a leading portion of the rod to create an oral product, moving the stop to a second location to allow the oral product to fall, moving the stop back to the first location, and repeating the process. A machine for forming an oral product can include a cutting device adapted to cut through a rod of plastic material, a stop spaced from the cutting device, the stop being adapted to be moved from a first location to a second location, a gripping device adapted to hold and index a rod towards the stop, and a load cell positioned to receive oral products cut from a rod by the cutting device. In some cases, the machine can include an infeed tray to support the rod material. In some cases, the machine can include a drop tube for directing a cut oral product to the load cell. In some cases, the machine can include air nozzles to blow the product off or out of the load cell and towards a collection location or a discard location.

The rod of oral product material can be an extruded rod. The rod of oral product material can include one or more polymers and one or more additives dispersed in the one or more polymers. In some cases, the rod of oral product material can include nicotine, cellulosic fibers, sweetener, and flavorants dispersed in a polymer matrix (e.g., polyurethane matrix). In some cases, the rod of oral product material can include tobacco dispersed in a polymer matrix (e.g., polyurethane matrix). In some cases, the rod of oral product material can be tobacco and nicotine free. The rod can be at a temperature of below 50° C. when placed in a machine provided herein. The rod can have a variety of cross-sectional shapes. The rod can have a uniform cross-sectional shape. The rod can have a length of at least 5 times the largest diameter of the rod. In some cases, the rod can have a length of at least 1 meter, of at least 5 meters, or of at least 10 meters. An extended infeed tray can be used to support the rod.

A gripping device can clamp down on the rod to ensure that it does not move during a cutting operation. In some cases, multiple gripping devices can be used. In some cases, a gripping device can include a pair of gripping rollers positioned on opposite sides of the rod. Gripping rollers can rotate to index the rod while gripping the rod. In some cases, a gripping device can include two gripping pads that clamp on opposite sides of the rod. Gripping pads can be moved from a first gripping location to a second gripping location. In some cases, between cutting operations, the gripping pads can become spaced from each other to disengage from the rod at the second gripping location, move towards to the first gripping location, grip the rod again at the first gripping location, and index back to the second location to index the rod. In some cases, the rod advance mechanism may include a weighted guide roller or other device to hold the rod in position while the disengaged gripper moves from the second gripping location back to the first gripping location. In some cases, a gripping device can include gripping rollers to index the rod and gripping pads that do not index back and forth relative to the cutting device, but merely engage the rod during each cutting operation.

A cutting device can include a cutting blade, a blade holder, a blade holder guide, and a blade actuator to cut the product. A blade holder and a blade holder guide can be positioned to ensure that the blade remains in a predetermined position relative to the stop so that each oral product cut from the rod has a consistent thickness. The blade actuator can be timed to ensure that the cutting operation does not begin until the rod is fully indexed to abut the stop.

The stop provides a mechanical stop surface to ensure that a leading end of the rod is properly spaced from the cutting blade during a cutting operation. The stop can be an adjustable stop. In some cases, the stop can include a micrometer head to allow for small adjustments. During a cutting operation, the stop is positioned in a first location, but between cutting operations, the stop can be actuated to a second location. Moving the stop to the second location permits the oral product to fall out of the way to permit the rod to be indexed again and a next oral product to be cut. In some cases, the stop is pivoted from the first location to the second location.

A drop tube can be provided below the cutting device to catch oral products as they fall from the cutting blade and/or stop surface. In some cases, the drop tube can include a bottom door, which can be selectively actuated to drop one or more oral products to a load cell. A load cell can weigh one or more oral products to ensure that they fall within a desired weight range. If an oral product, or group of oral products, is within a desired weight range, they can be transferred to a collection location. If an oral product, or group of oral products, is outside of a desired weight range, they can be transferred to a discard location. In some case, air nozzles can blow the oral products to the appropriate location. In some cases, a star wheel can be used to direct oral products to the appropriate location.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Machines and methods for forming oral products are provided herein. The oral products can include a mouth-stable polymer matrix and one or more additives. The additives can include flavorants, sweeteners, active ingredients, or any other suitable ingredient intended to be released from the oral product when the oral product is received within the oral cavity and exposed to saliva. The oral products can provide a favorable additive release profile and tactile experience. The methods and machines provided herein can reliably produce oral products have uniform dimensions.

The machine and methods provided herein reliably produce uniformly shaped oral products at speeds of up to 100 cuts per minute per lane, with minimal or no material loss due to blade kerf, reduced manpower, and with accurate product weighing and classification of cut oral products. In some cases, a machine provided herein can provide speeds of greater than 50 cuts per minute per lane. The machine provided herein can accurately cut a consistent thickness due to the placement of a stop at a spaced distance from a cutting blade and the use of gripping devices to grip index a leading end of the rod to a position abutting the stop. The stop can move between a first location and a second location that permits a cut oral product to freely fall out of the way so that the rod can be indexed again to cut the next oral product. The use of the stop also allows for a blade that shears the rod with minimal or no kerf. The dropping of the piece to a load cell that automatically weighs one or more oral products can reduce the manpower needed to operate the machine and eliminate human error in weighing and classifying oral products.

Figure 1:
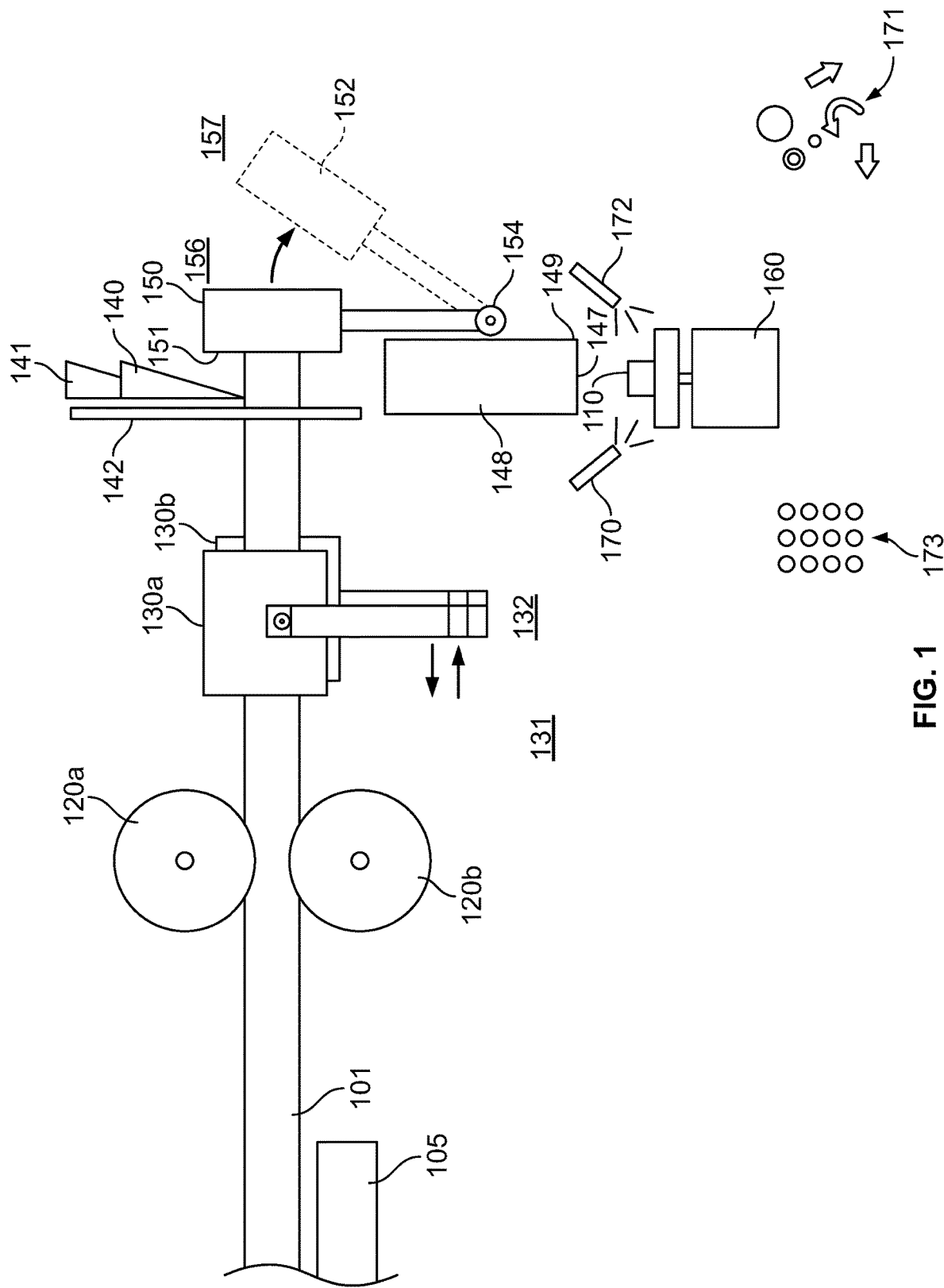
FIG. 1 is an illustration of a machine/method used to cut oral products from a rod of oral product material.
Figure 3A:
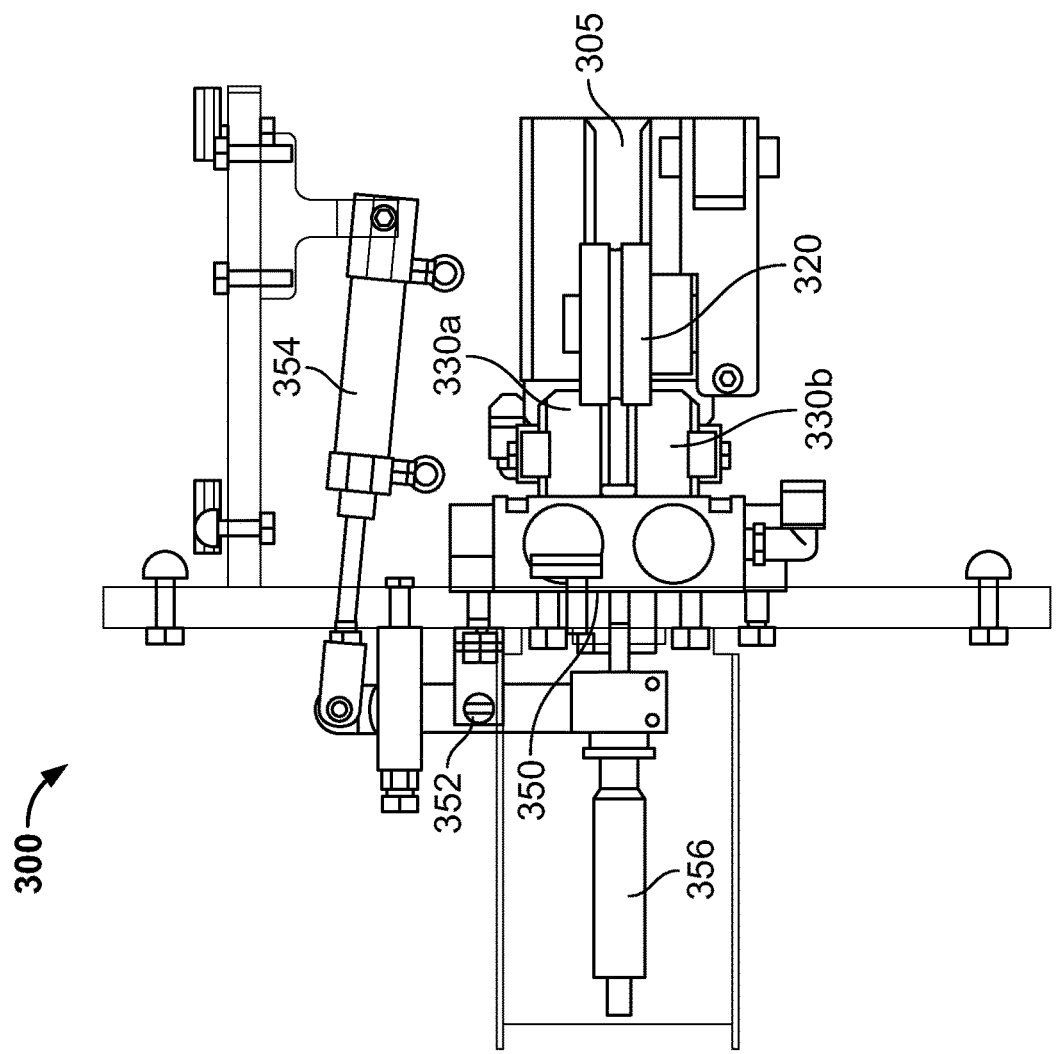
FIGS. 3A-3D illustrate an exemplary cutter assembly.

FIG. 1 depicts an illustration of a machine/method for creating oral products. A rod 101 of oral product material (discussed in greater detail below) can be gripped by gripping rollers 120a and 120b and/or gripping pads 130a and 130b. In some cases, a machine can include gripping rollers without gripping pads, gripping pads without gripping rollers, or a combination of gripping rollers and gripping pads. In some cases, multiple pairs of gripping rollers can be used. In some cases, multiple pairs of gripping pads can be used.

In some cases, an infeed tray 105 can be used to support the rod material. An infeed tray can include a long (e.g., 1 meter, 5 meters, 10 meters, or 25 meter) flat surface. In some cases, an infeed tray can include multiple rollers that rotate freely. The gripping rollers 120a and 120b and/or gripping pads 130a and 130b can index the rod forward after each cut. The gripping rollers 120a and 120b and/or gripping pads 130a and 130b can clamp down on the rod to ensure that it does not move during a cutting operation. Gripping pads 130a and 130b can be moved from a first gripping location 131 to a second gripping location 132. In some cases, between cutting operations, the gripping pads 130a and 130b can be separated to be spaced from each other to disengage from the rod at the second gripping location 132, moved towards to the first gripping location 131, grip the rod again at the first gripping location 131, and index back to the second location 132 to index the rod. In some cases, a gripping device can include gripping rollers 120a and 120b to index the rod and gripping pads 130a and 130b that do not index back and forth relative to the cutting device, but merely engage the rod during each cutting operation.

A cutting device can include a cutting blade 140, a blade holder 141, a blade holder guide 142, and a blade actuator (not shown) to cut an oral product 110 from the rod 101. A blade holder 141 and a blade holder guide 142 can be positioned to ensure that the blade remains in a predetermined position relative to a stop 150 so that each oral product 110 cut from the rod 101 has a consistent thickness. The blade actuator can be timed to ensure that the cutting operation does not begin until the rod is fully indexed to abut the stop.

The stop 150 provides a mechanical stop surface to ensure that a leading end of the rod 101 is properly spaced from the cutting blade 140 during a cutting operation. The stop 150 can be an adjustable stop. In some cases, the stop 150 can include a micrometer head to allow for small adjustments. During a cutting operation, the stop 150 is positioned in a first location 156, but between cutting operations, the stop can be actuated to a second location 157 (shown in dotted lines 152). Moving the stop 150 to the second location permits the oral product 110 to fall out of the way to permit the rod 101 to be indexed again and a next oral product 110 to be cut. In some cases, the stop 150 is pivoted from the first location 156 to the second location 157 about a pivot 154.

A drop tube 148 can be provided below the cutting device to catch oral products 110 as they fall from the cutting blade 140 and/or stop surface 151. In some cases, the drop tube 148 can include a bottom door 147 with a hinge 149, which can be selectively actuated to drop one or more oral products to a load cell 160. The load cell 160 can weigh one or more oral products 110 to ensure that they fall within a desired weight range. In some cases, a plurality of oral products 110 can be weighed at once to see if the sum of their weight is within a desired range for that number of oral products 110. For example, ten oral products could be weighed at once to determine if those oral products are, on average, within the desired weight range. If an oral product, or group of oral products, is within a desired weight range, they can be transferred to a collection location 173. If an oral product, or group of oral products, is outside of a desired weight range, they can be transferred to a discard location 171. In some case, air nozzles 170 and 172 can blow the oral products to the appropriate location.

Figure 2:
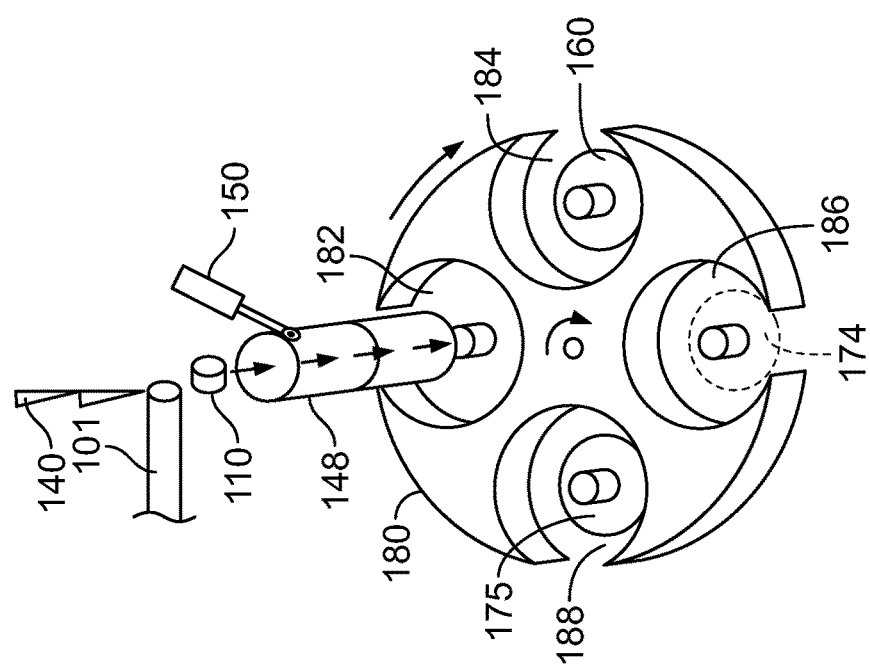
FIG. 2 is an illustration of a star wheel used to weigh and sort oral products cut from a rod or oral product material.

FIG. 2 illustrates a star wheel 180, which can be used to help weigh and classify one or more oral products 110. As shown, the rod 101 can be cut with the cutting blade 140 using the stop 150 as discussed above. The oral product 110 can drop into the drop tube 148, which can direct the oral product 110 to a recess in a first position 182 of a star wheel. After one or more oral products fall into the recess at the first position 182, the star wheel can rotate to move the one or more oral products 110 to a second position 184 over the load cell 160. The load cell 160 can weigh the oral product(s) and classify whether the oral product(s) are within a predetermined range. The star wheel 180 can then move to a third position 186, which is positioned over a trap door 174. The trap door 174 can be selectively open or closed depending on the classification of those oral products based on the weight reading of the load cell 160. For example, if the oral product(s) 110 are within range, the trap door 174 can be opened to allow for the oral product(s) 110 to fall to a collection location. If the oral product(s) are outside of the predetermined range, the trap door 174 can be closed so that the oral product(s) are moved to a fourth position 188 when the star wheel 180 next rotates to fall through a hole 175 to a discard location.

Figure 3B:
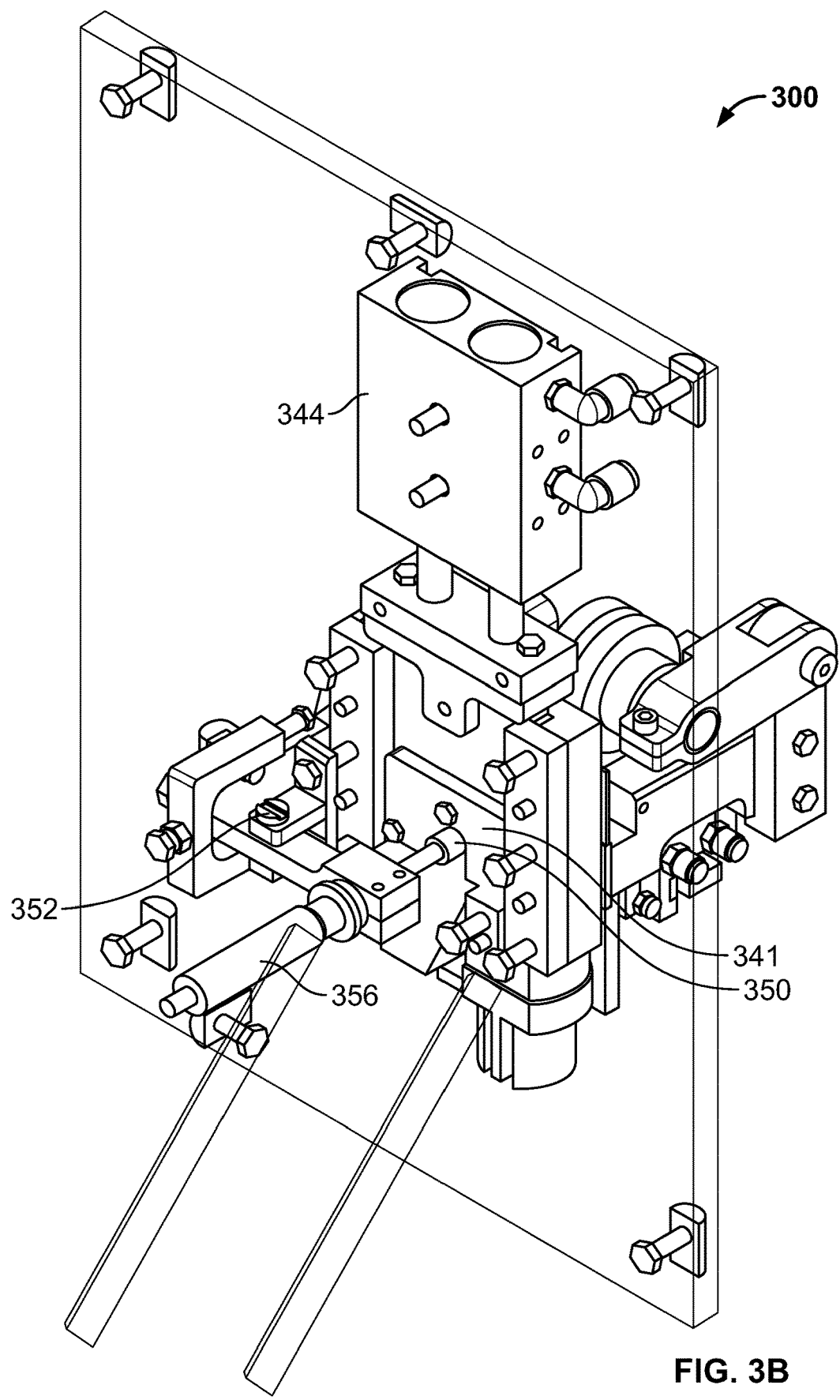
Figure 3C:
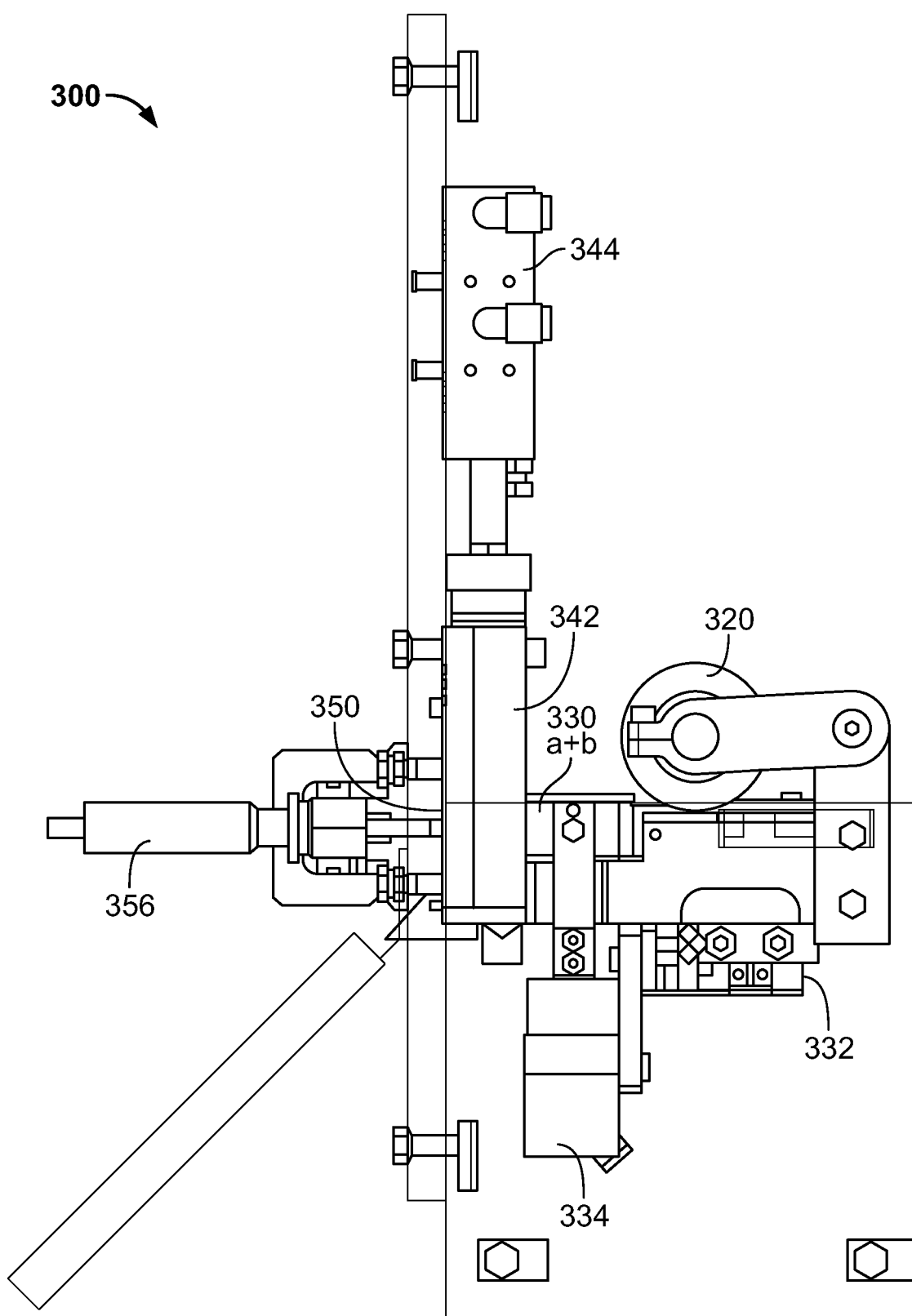
Figure 3D:
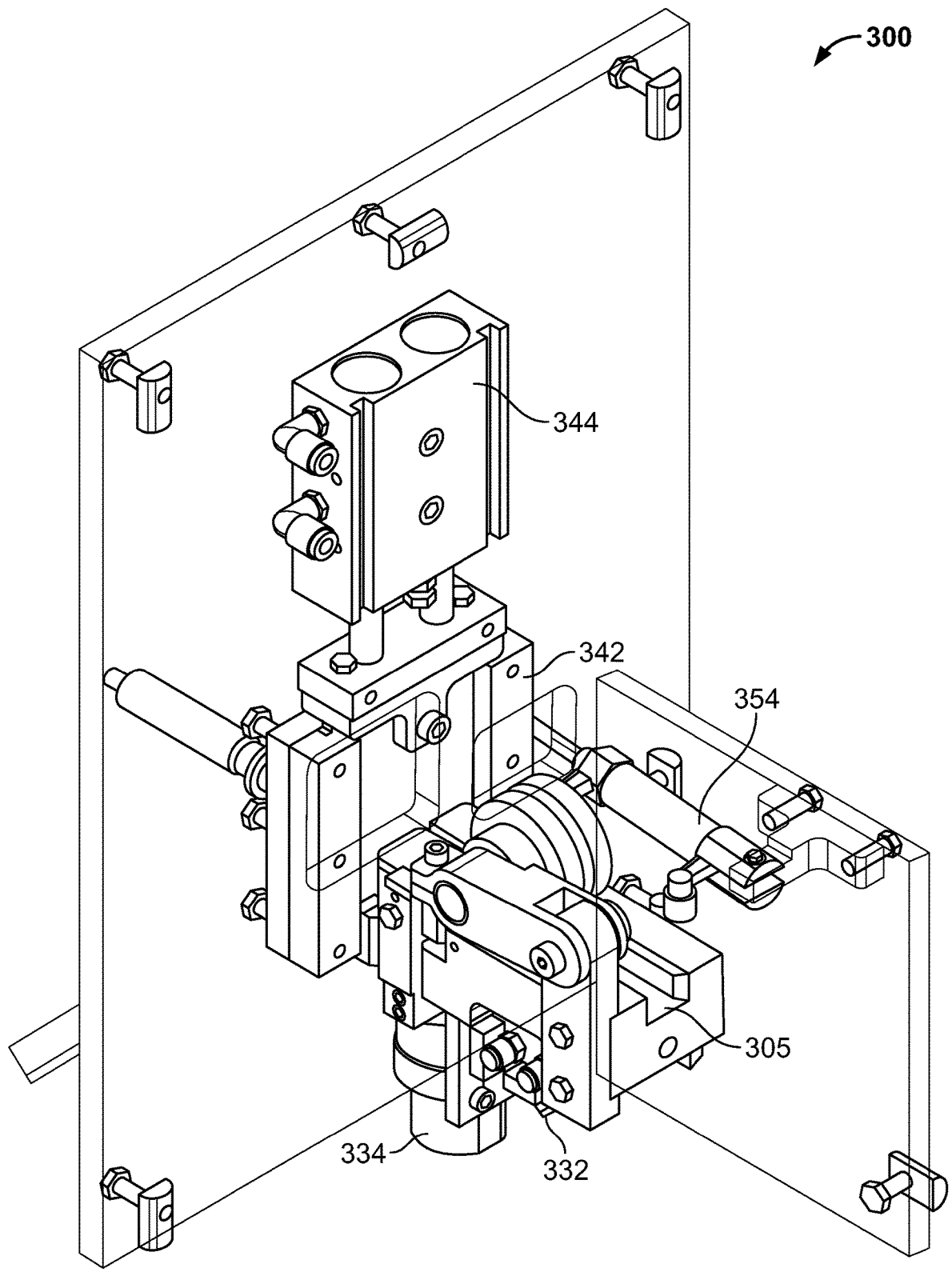
Figure 3E:
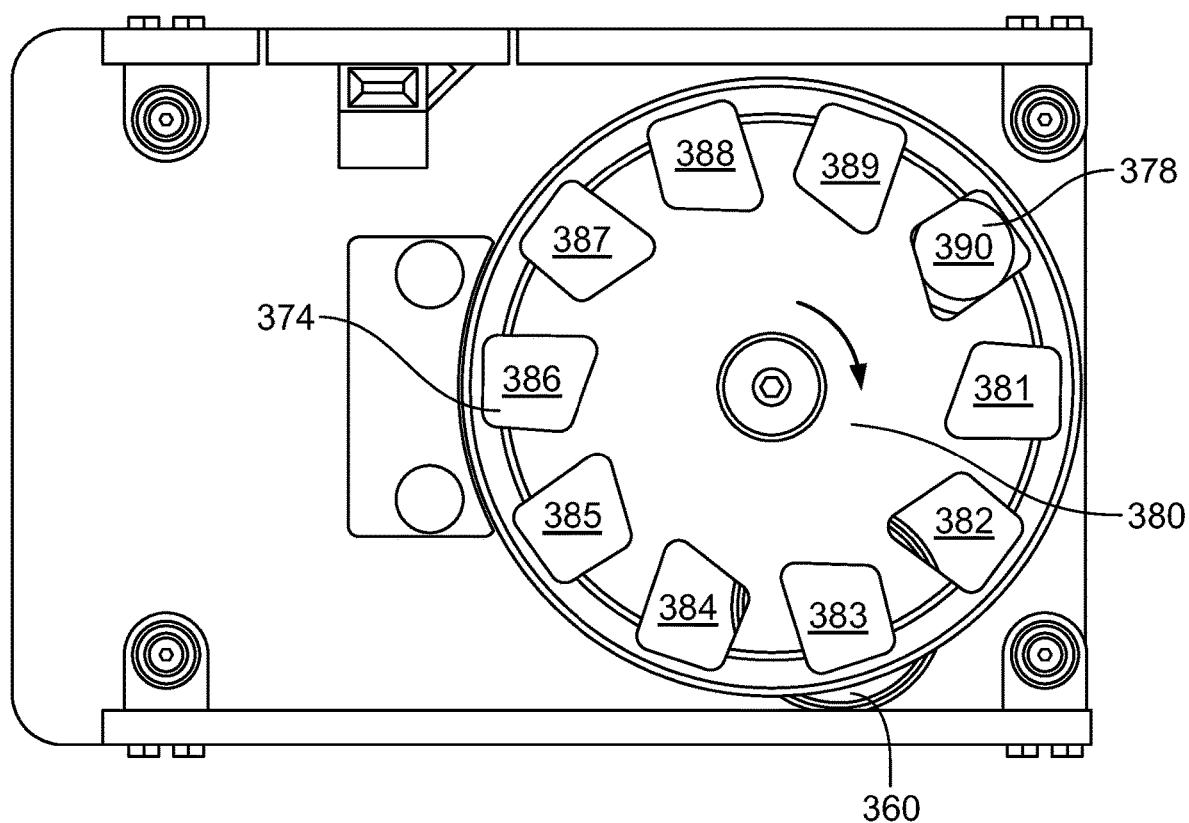
FIGS. 3E-3H illustrate an exemplary rotary weight station.
Figure 3G:
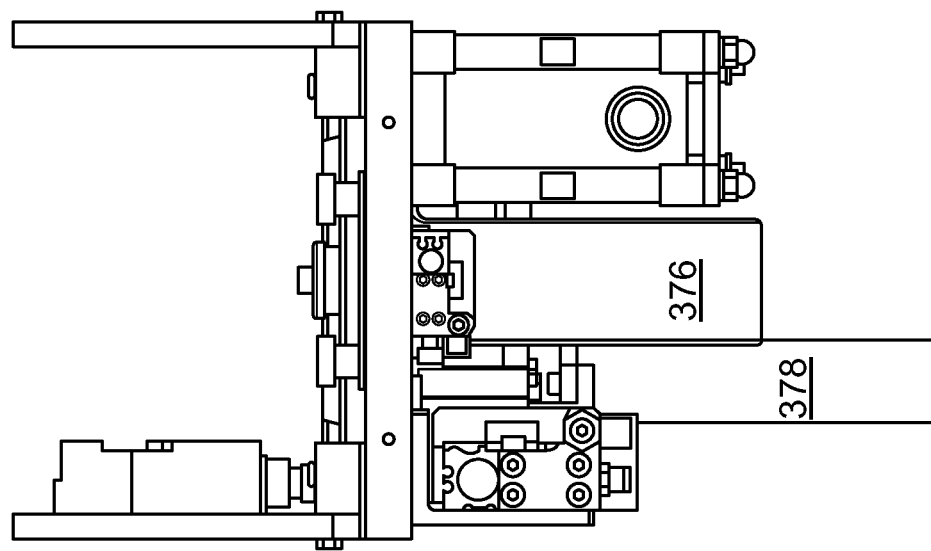
Figure 3F:
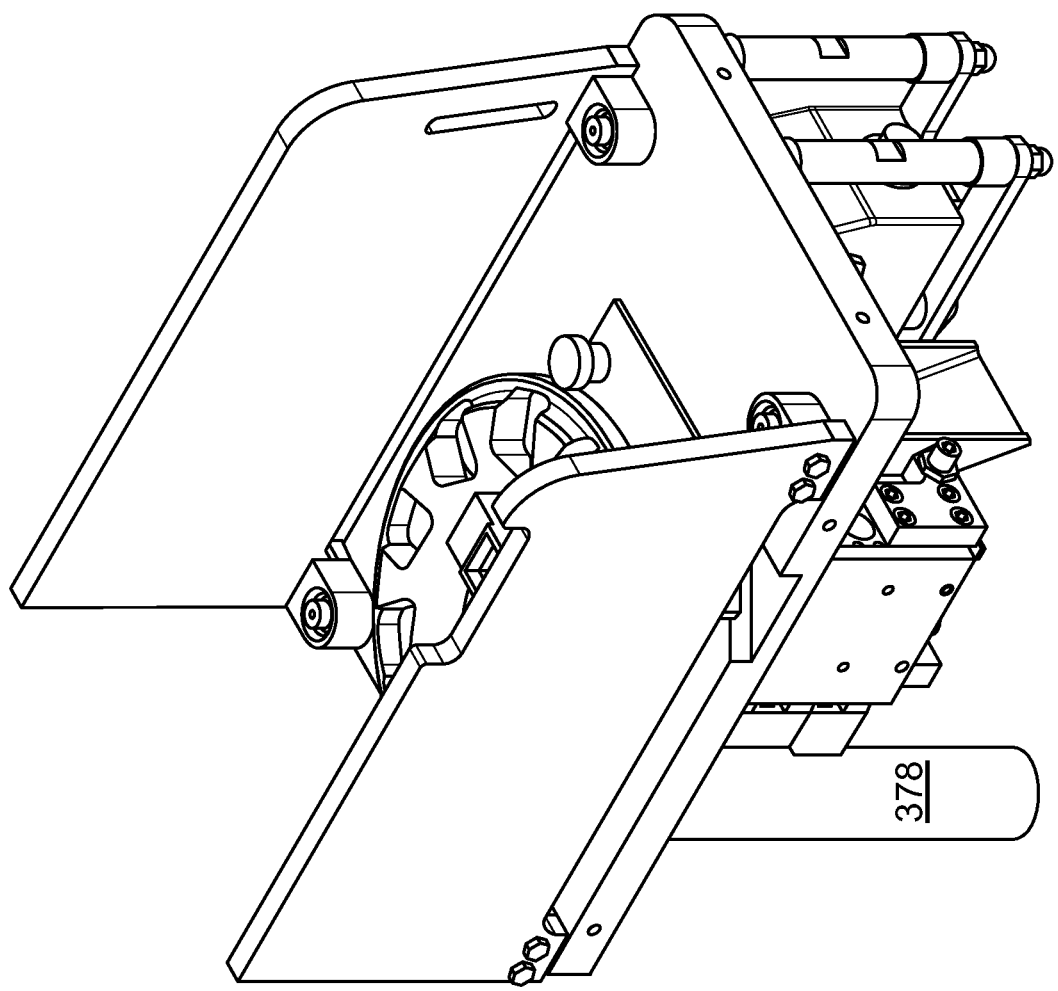
Figure 3H:
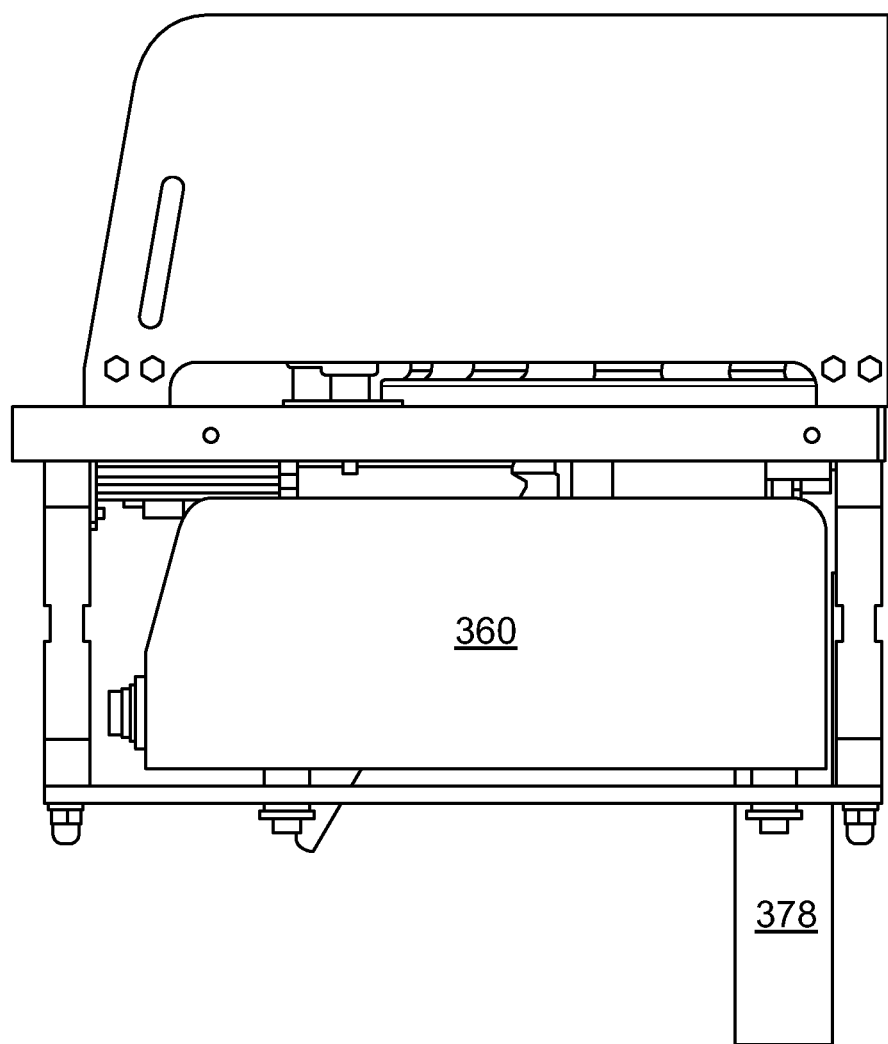

FIGS. 3A-3D illustrate an exemplary cutter assembly 300 for cutting a rod into a plurality of oral products. As shown, the assembly can include an infeed tray 305. A guide roller 320 can be used to ensure a proper alignment of the rod as it advances. Gripping pads 330a and 330b can clamp on the sides of a rod being advanced through the cutter assembly 300. As shown in FIG. 3C, the cutter assembly 300 can include a gripper actuator 334 that can cause the gripping pads 330a and 330b to clamp together or release. In some cases, the gripping pads 330a and 330b can grip a rod and move to advance the rod through the cutter assembly 300. As shown in FIG. 3C, the cutter assembly 300 can include a gripper advance actuator 332 that can cause the gripping pads 330a and 330b to move back and forth relative to the blade, which can be used to intermittently advance the rod between cutting operations.

A rod being advanced will have a leading end abut an adjustable stop 350. Between cutting operations, the adjustable stop 350 can be pivoted about stop pivot 352 by a stop actuator 354. A micrometer head 356 can be used to make small and precise adjustments to the placement of the adjustable stop 350. The rod is cut by a cutting blade in a blade holder 341 guided by a blade holder guide 342 and actuated by a blade actuator 344.

FIGS. 3E-3H illustrates a rotary weigh station, which can be used to weigh and classify one or more oral products in a manner similar to that described above in reference to FIG. 2. Oral products can drop into one of the cells at positions 381, 382, or 383 in wheel 380. Wheel 380 can incrementally rotate after a predetermined number of products fall into a given cell (e.g., a cell at position 381). After rotation through one or more increments, the product(s) in a given cell will eventually move into position 383, where the product(s) are weighed by weigh scale 360. A programmable logic controller, which can include memory, can then store the weight or a classification for the product(s) in that cell and associate the weight with that cell to control whether those products are sent to a waste chute 378 or to a good products chute 376. The product(s) in a given cell will then move as the wheel 380 is rotated through positions 384 and 385 to position 386, which is positioned over a trap door 374. Based on the stored weight or classification of the product(s) in the cell, the programmable logic controller can open or close the trap door 374. If the product(s) is/are in a predetermined weight range, the trap door 374 will open to allow the product(s) to fall into the good product chute 376. If the product(s) is/are outside of a predetermined weight range, the trap door 374 will be closed to allow the product(s) to in the cell to advance past position 386 to position 387. As the wheel 380 continues to rotate, reject products will pass through positions 387, 388, and 389, and eventually reach the waste chute 378 at position 390.

Figure 6A:
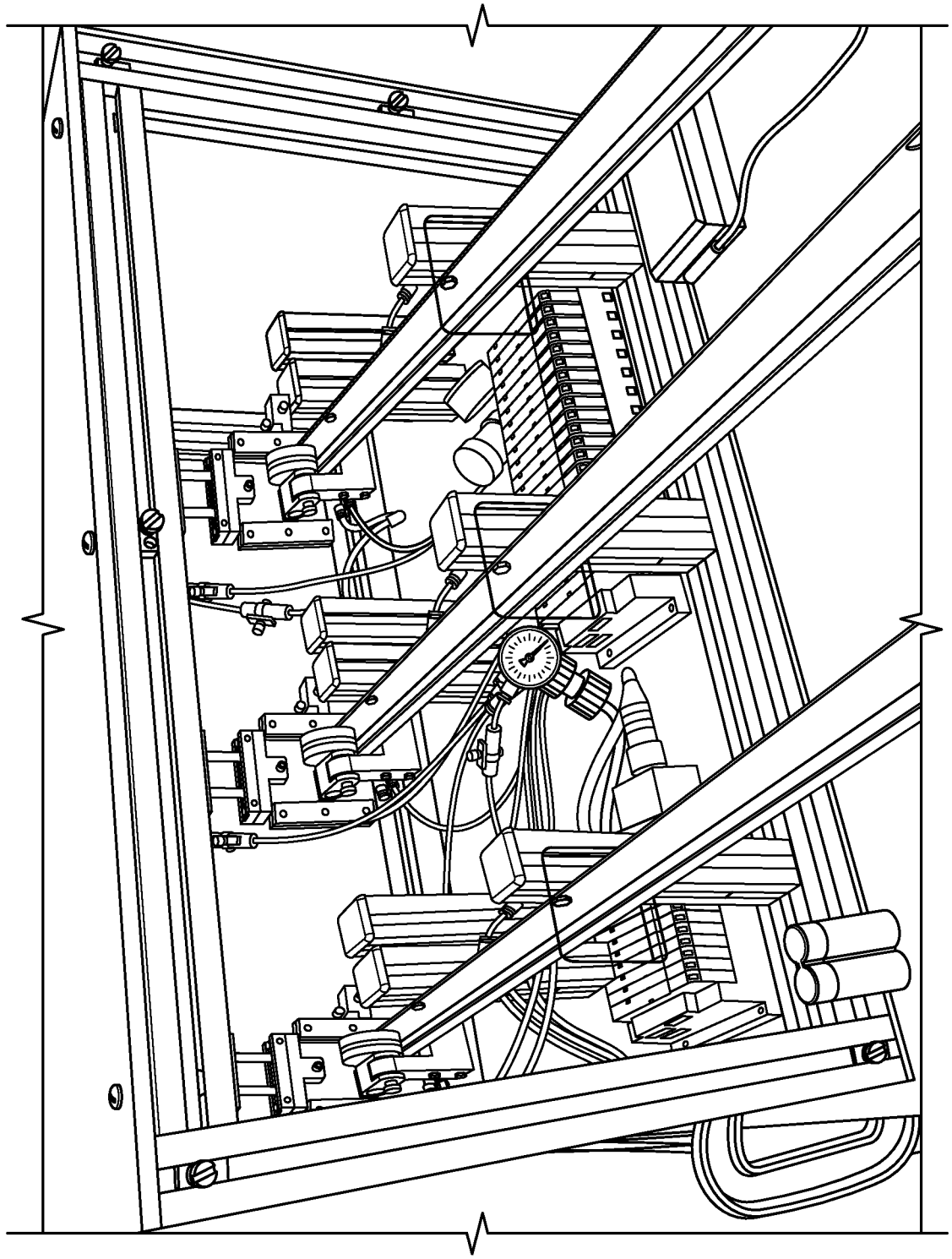
FIGS. 6A-6I are pictures of an exemplary machine used to cut oral products from a rod of oral product material.
Figure 6B:
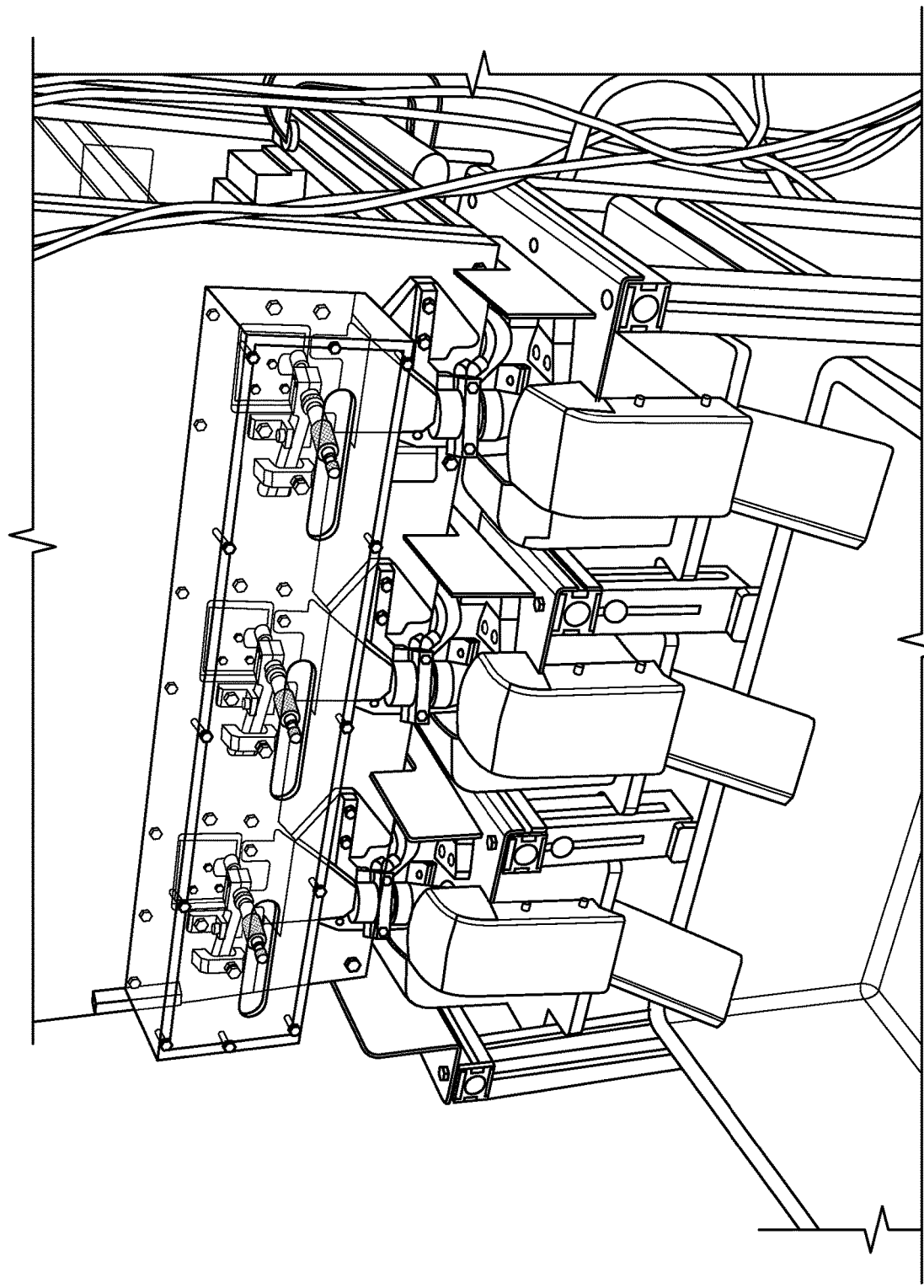
Figure 6C:
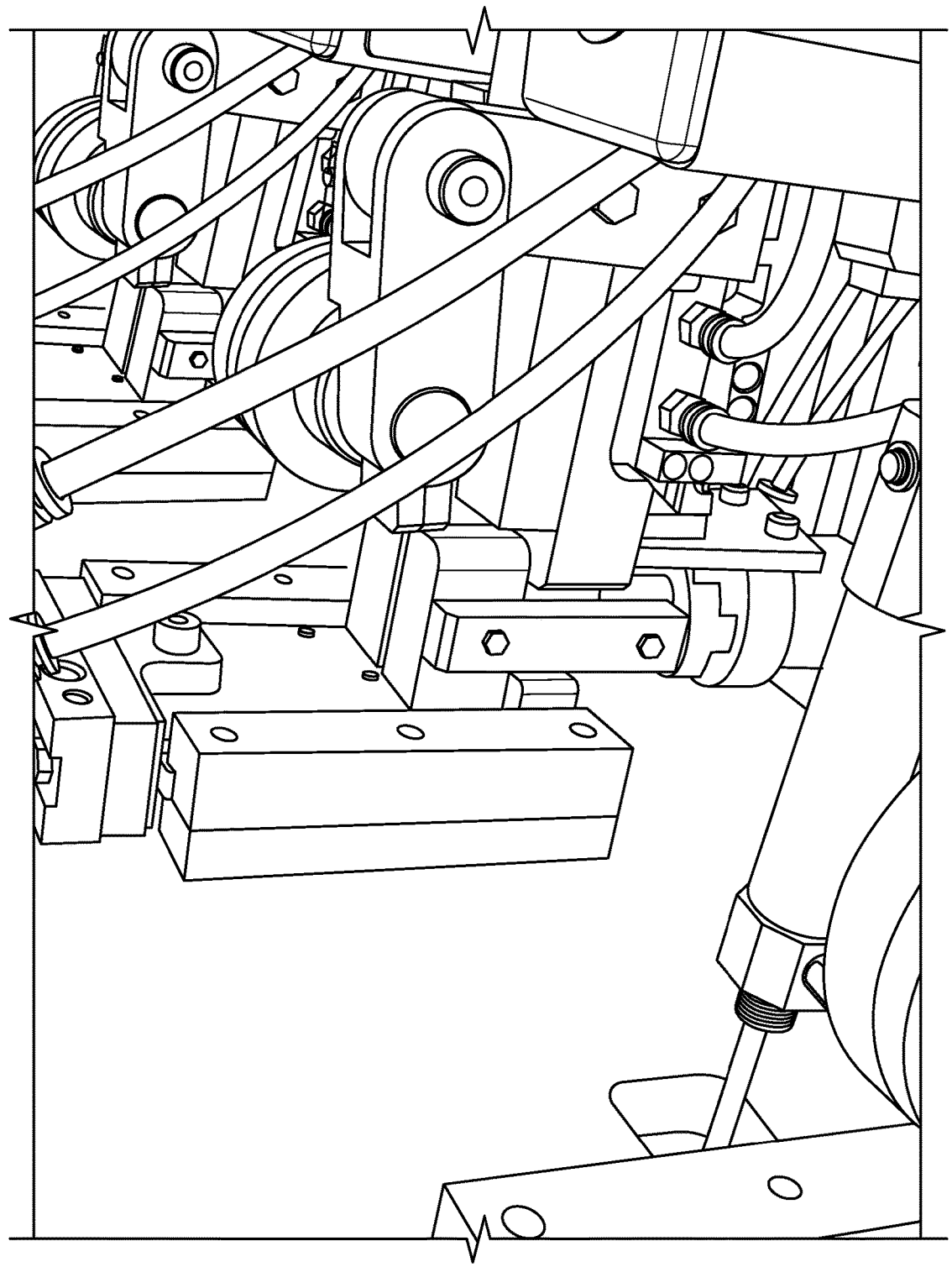
Figure 6D:
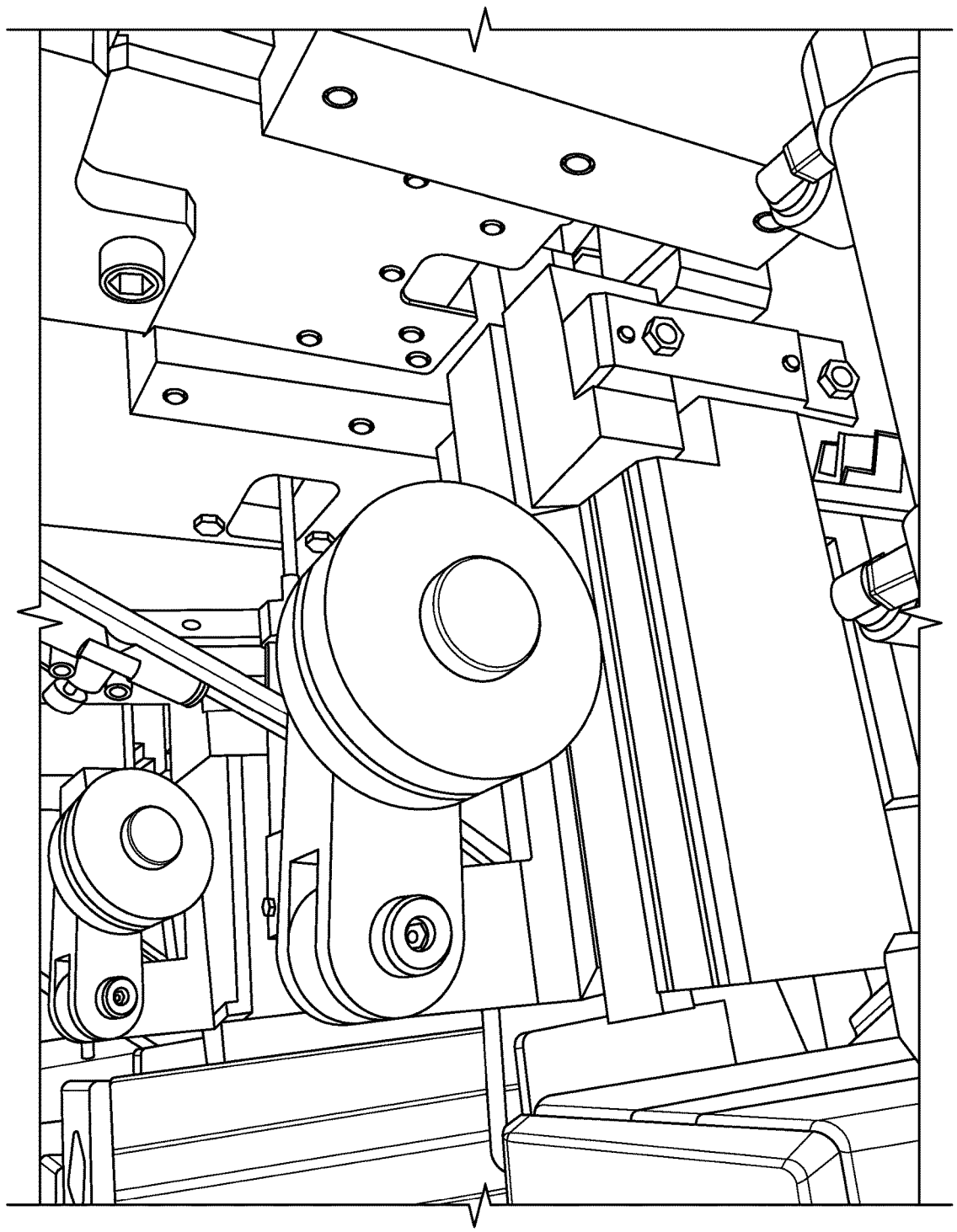
Figure 6E:
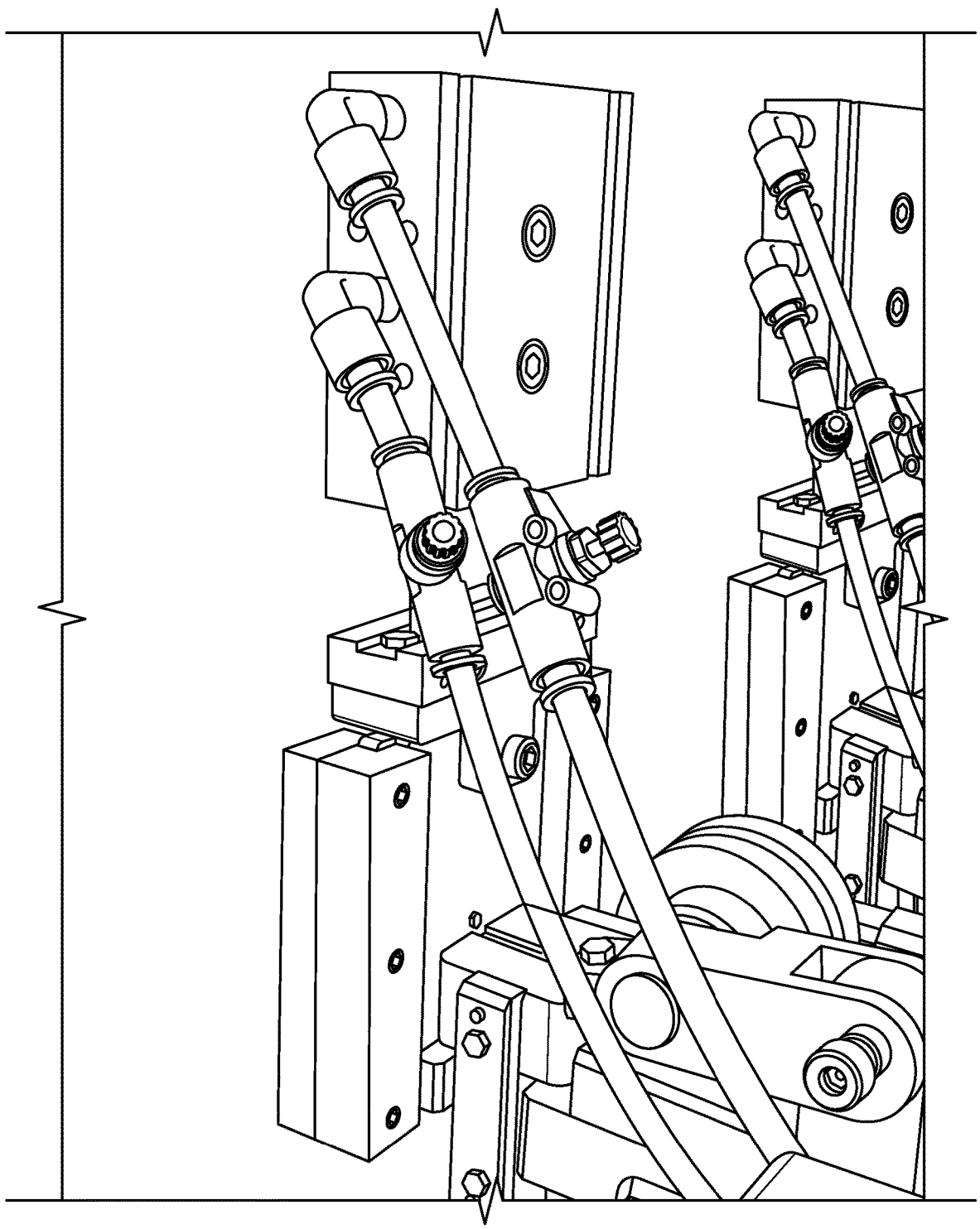
Figure 6F:
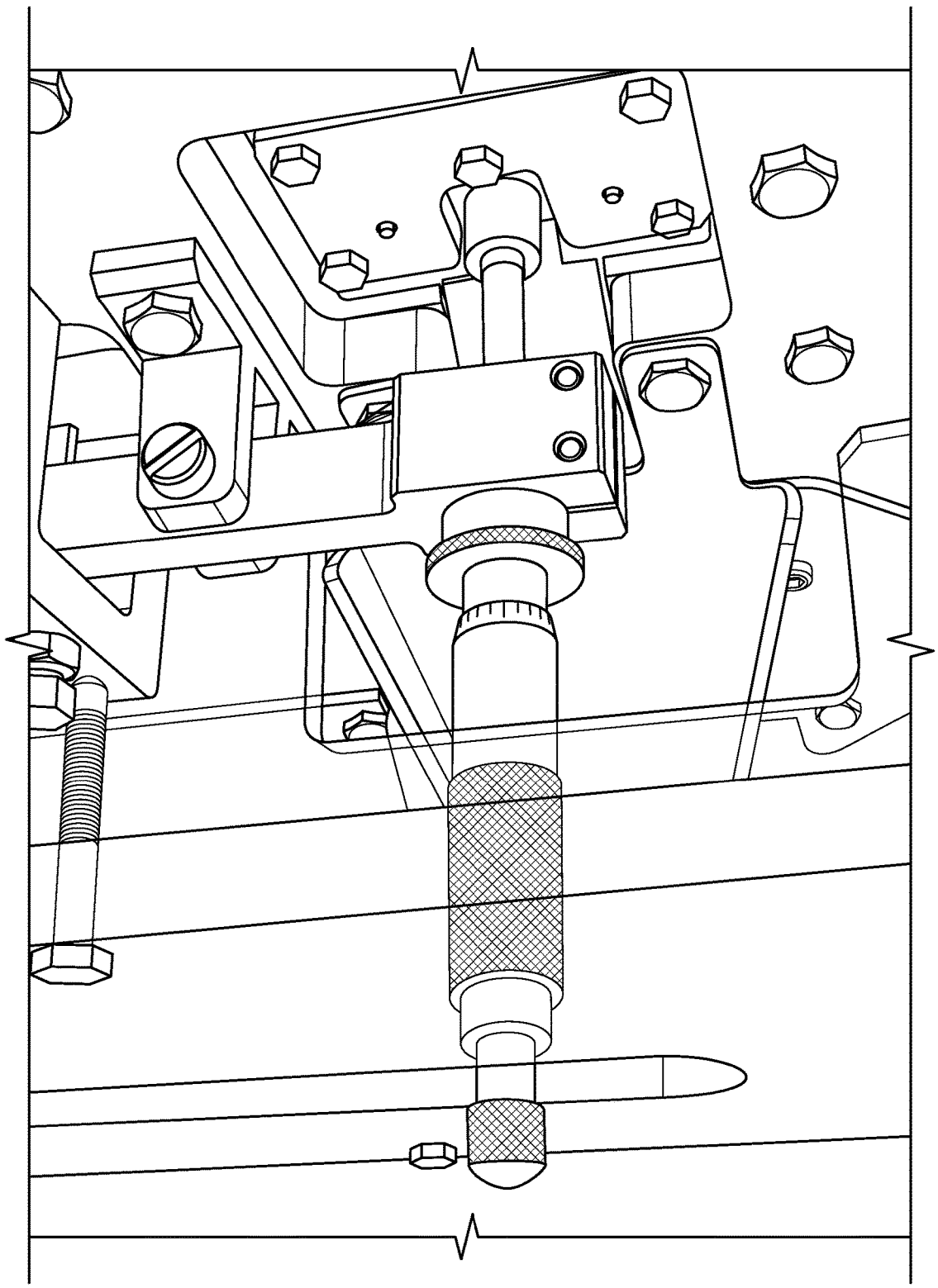
Figure 6G:
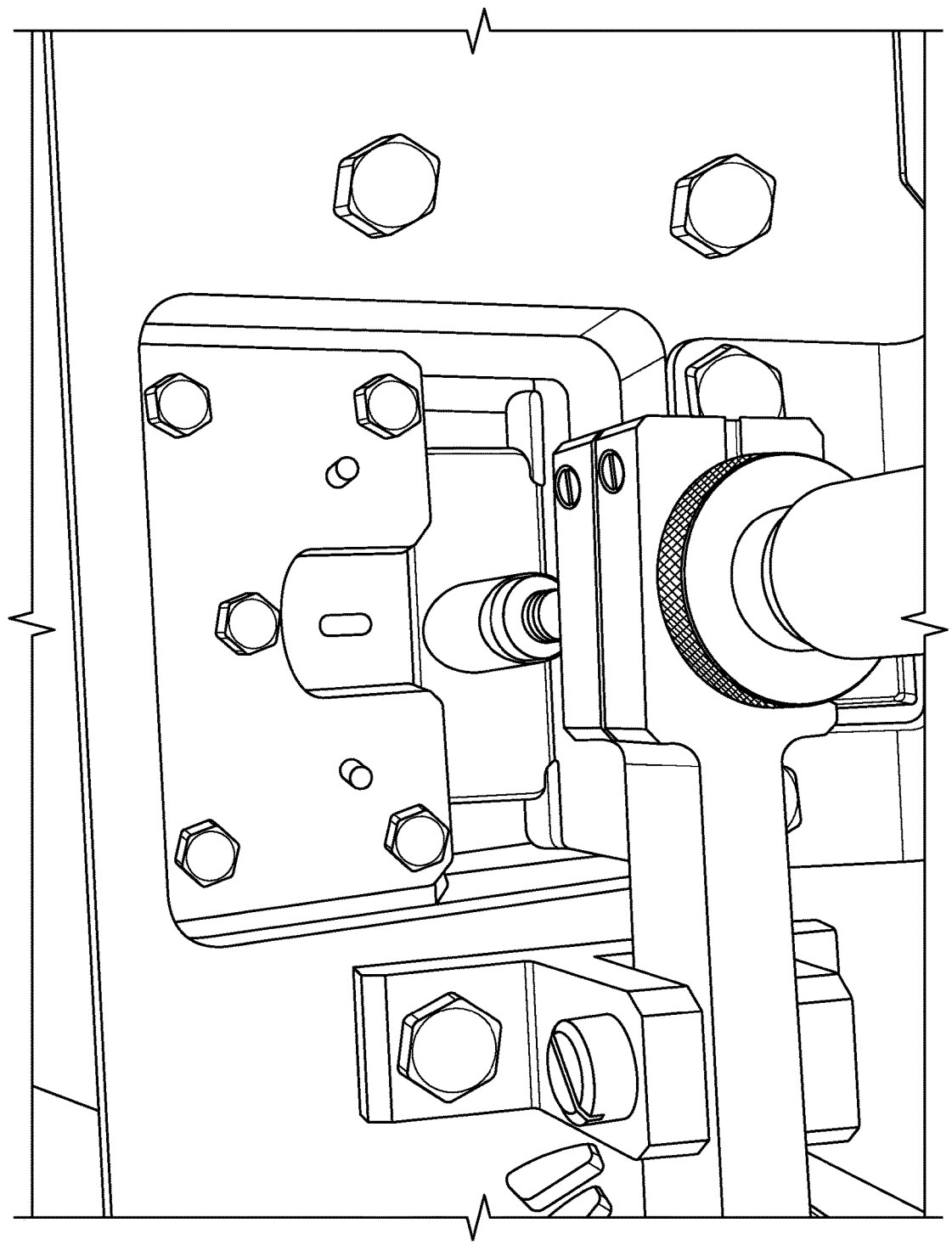
Figure 6H:
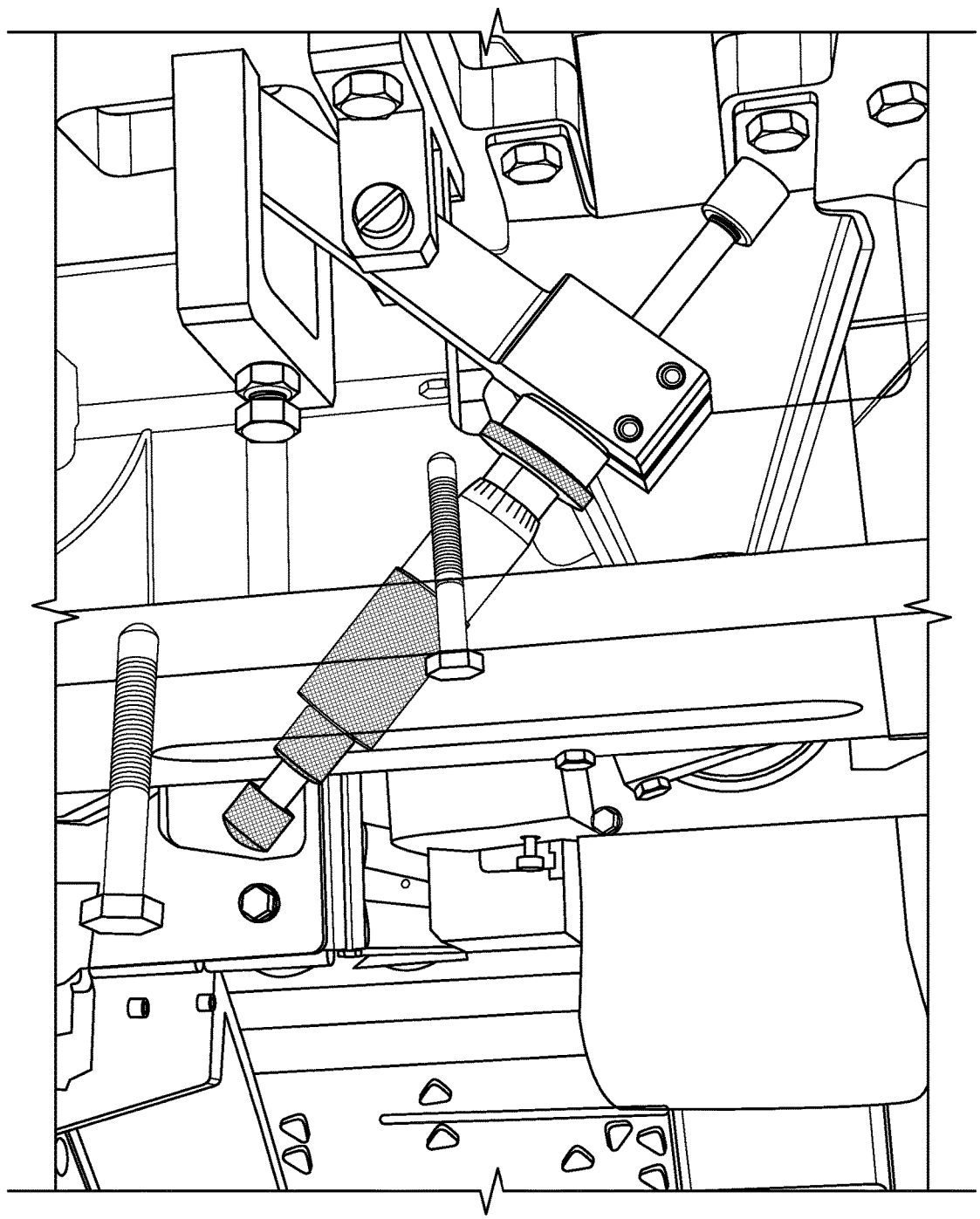
Figure 6I:
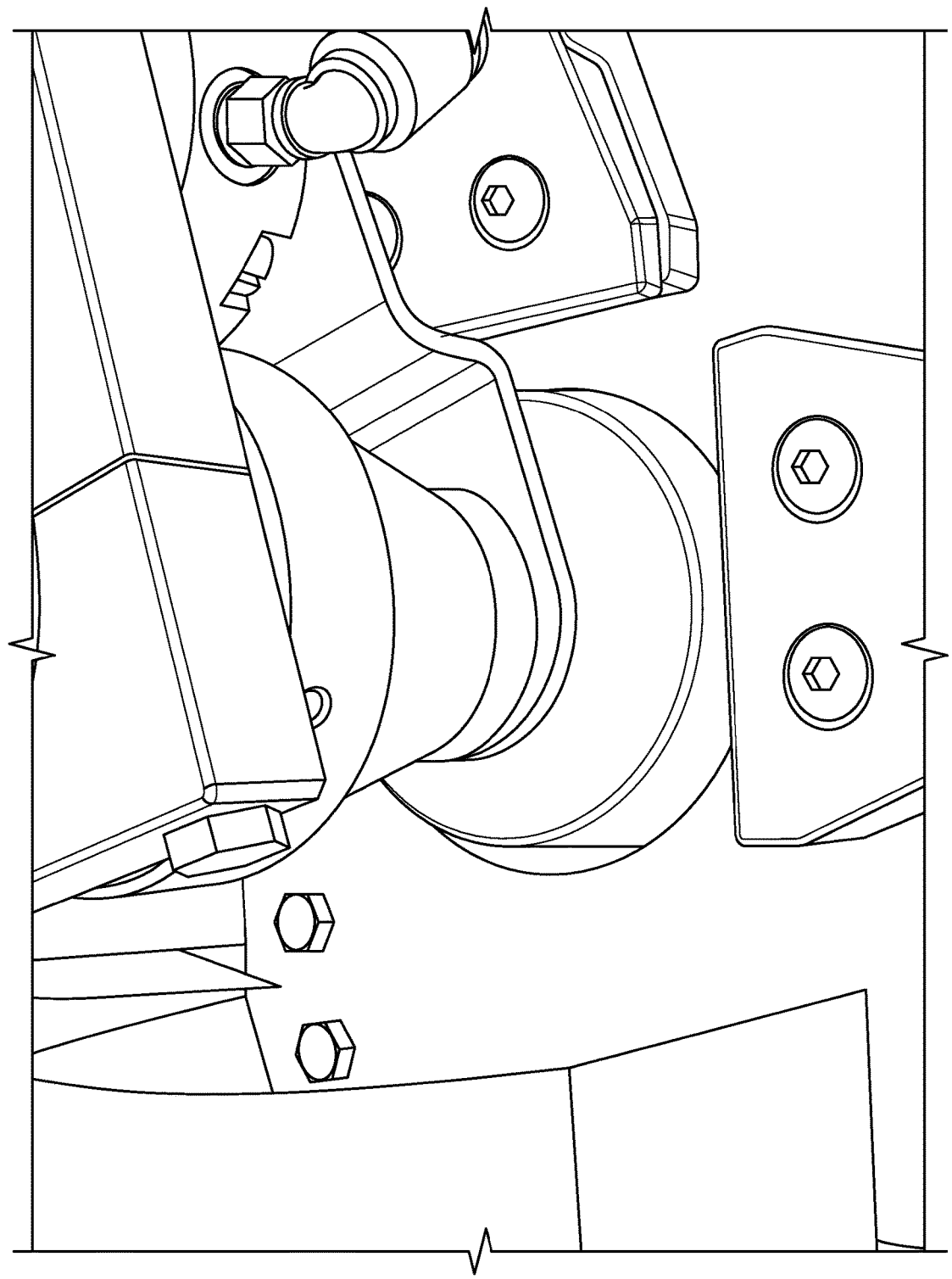

FIGS. 6A-6I are pictures of an exemplary machine provided herein. FIG. 6A depicts a rear view of a machine including three lines, each having an infeed tray. FIG. 6B depicts a front view of this same machine. As shown, each line includes a cutting device, a stop, and a load cell. FIG. 6C is a side view showing a guide roller, gripping pads, a blade guide, and an adjustable stop actuator. FIG. 6D shows a guide roller, gripping pads, a blade holder, and a blade guide. FIG. 6E shows a blade actuator, a blade guide, gripping pads, and a guide roller. FIG. 6F shows the adjustable stop engaged by a rod. FIG. 6G shows the adjustable stop, the cutting blade, the blade holder, and the gripping pads engaged with the rod. FIG. 6H shows the adjustable stop retracted to a second position so that a cut oral product can fall away from the cutting blade. FIG. 6I shows a drop tube, a bottom door of the drop tube, a load cell pan, and blow off nozzles.

Oral Product Shapes and Packaging

Figure 4:
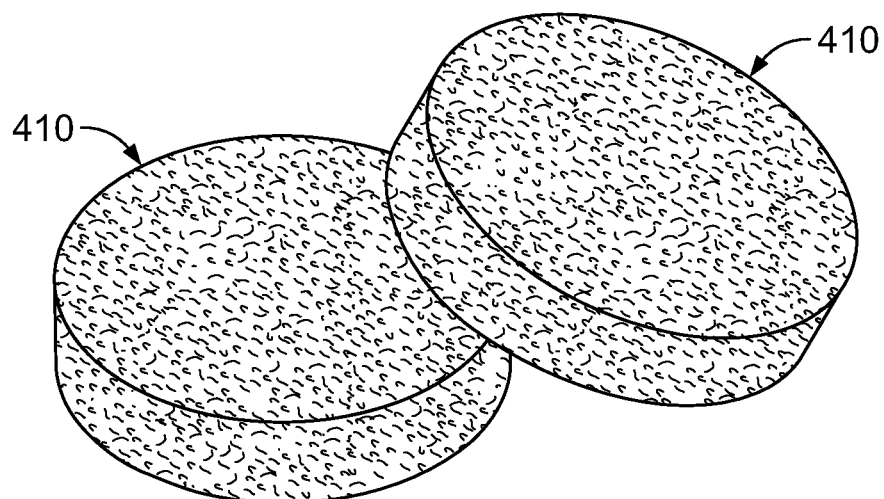
FIG. 4 is a perspective view of a pair of oral products.
Figure 5A:
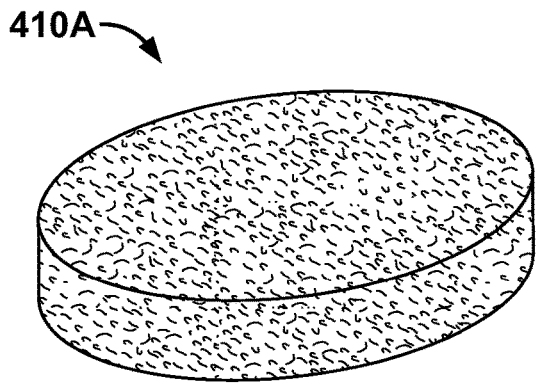
FIGS. 5A-5L illustrate various exemplary shapes of oral products.
Figure 5B:
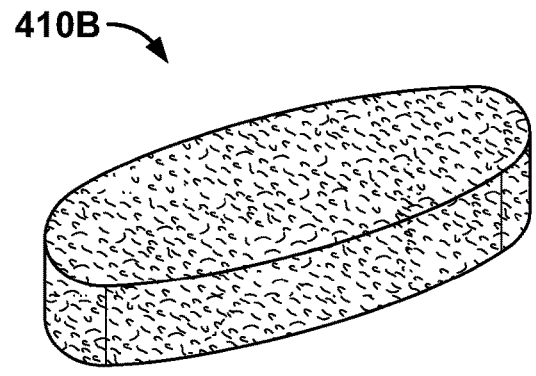
Figure 5C:
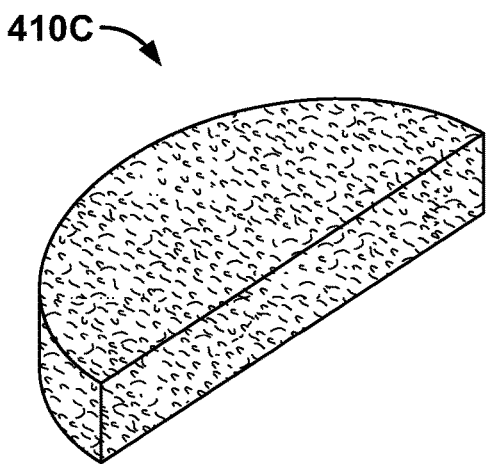
Figure 5D:
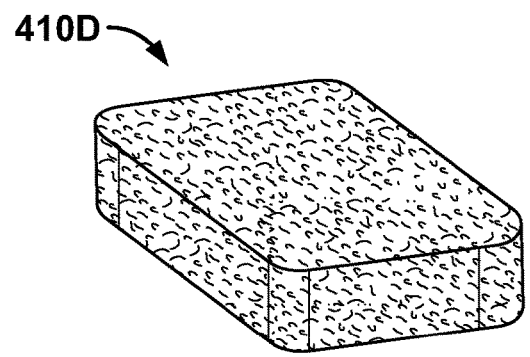
Figure 5E:
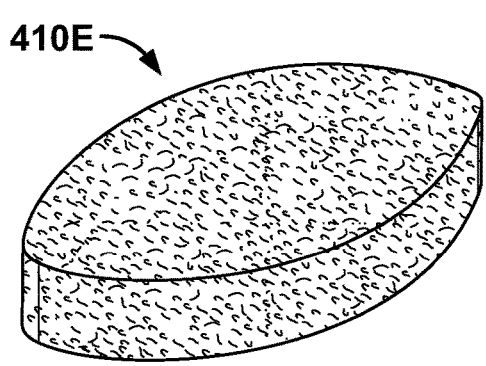
Figure 5F:
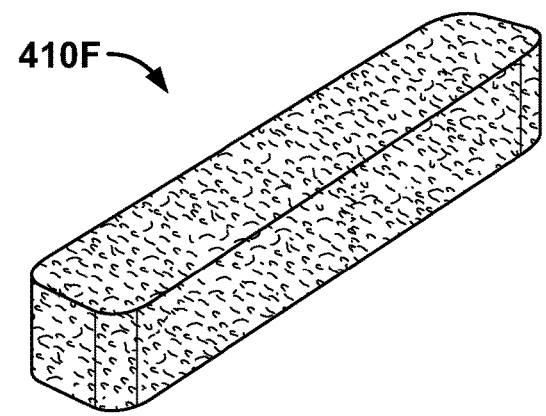
Figure 5G:
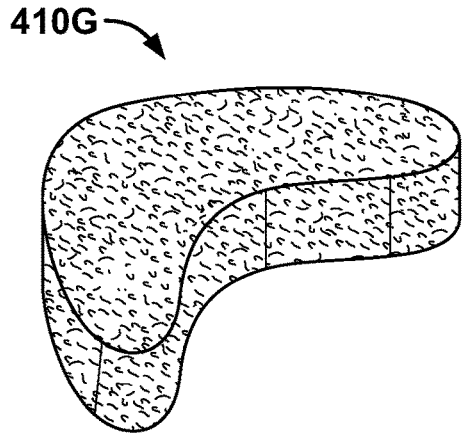
Figure 5H:
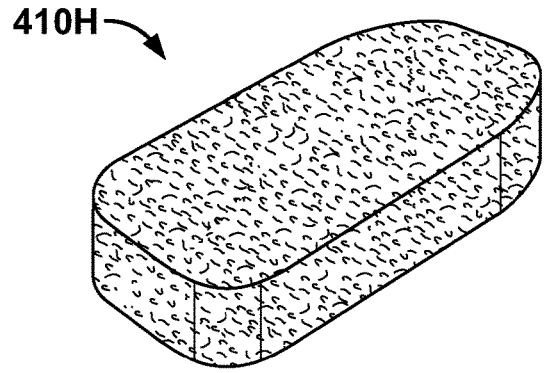
Figure 5I:
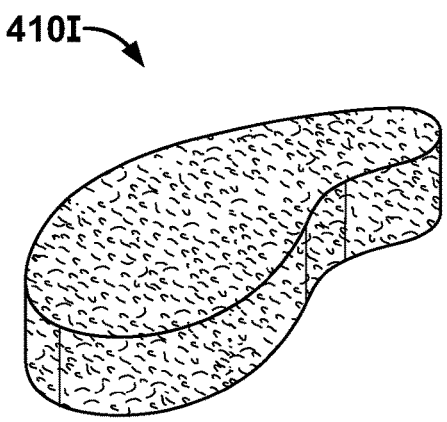
Figure 5J:
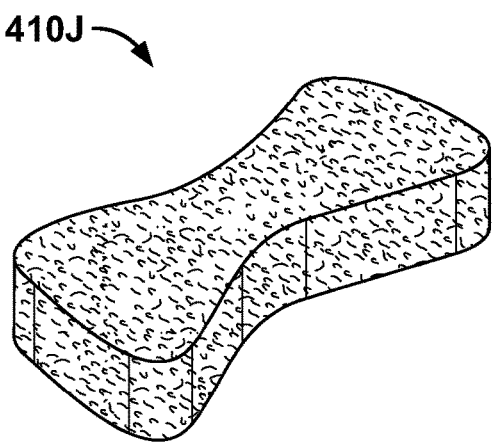
Figure 5K:
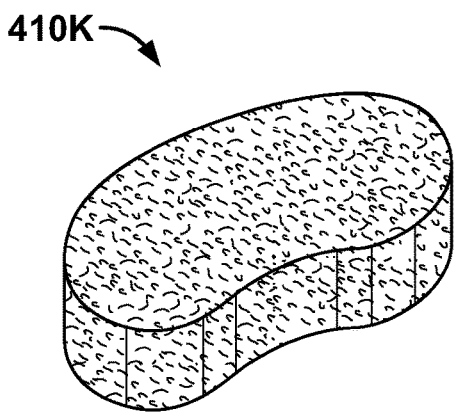
Figure 5L:
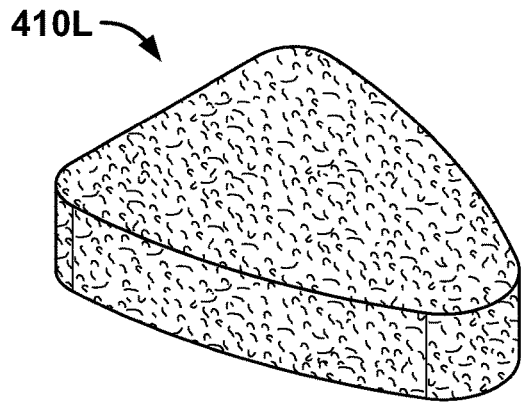

FIG. 4 depicts an example of an oral product 410. The oral product 410 has a disk shape. For example, the oral product 410 can have a diameter of about 12 mm and a thickness of about 2.5 mm. The oral products can be molded into any other desired shape. For example, referring to FIGS. 5A-5L, the oral product 410A-L can be formed in a shape that promotes improved oral positioning in the oral cavity, improved packaging characteristics, or both. In some circumstances, the oral product 410A-L can be configured to be: (A) an elliptical-shaped oral product 410A; (B) an elongated elliptical-shaped oral product 410B; (C) semi-circular oral product 410C; (D) square or rectangular-shaped oral product 410D; (E) football-shaped oral product 410E; (F) elongated rectangular-shaped oral product 410F; (G) boomerang-shaped oral product 410G; (H) rounded-edge rectangular-shaped oral product 410H; (I) teardrop- or comma-shaped oral product 410I; (J) bowtie-shaped oral product 410J; (K) peanut-shaped oral product 410K; and (L) shield-shaped oral product 410L.

One or more oral products 410 or 410A-L can be packaged in a variety of conventional and non-conventional manners. For example, a plurality of oral products 410 or 410A-L can be packaged in a container having a lid. In some cases, a plurality of oral products 410 or 410A-L can be stacked and packaged in a paper, plastic, and/or aluminum foil tube. The packaging can have a child-resistant lid. The oral product 410 or 410A-L can also include additional elements. In some cases, a mouth-stable polymer matrix including nicotine or a derivative thereof can be attached to a rod, tube, or stick.

Other Materials

The extrudate and thus the resulting oral products 410 or 410A-L include at least one polymer and one or more additives. The additives can be flavorants, sweeteners, active ingredients, or any other substance intended to be released when placed within a mouth. The ingredients listed below are merely illustrative and non-limiting.

Polymers

In some cases, the polymer can be a mouth-stable polymer. Suitable mouth-stable polymers include thermoplastic elastomers such as polyurethane. As used here, the term "mouth stable" means that the polymer does not appreciably dissolve or disintegrate when exposed to saliva within an oral cavity and at the normal human body temperature (e.g., about 98.6° F.) over a period of one hour. In addition to biostable polymers, mouth-stable polymers can include biodegradable polymers that breakdown over periods of days, weeks, months, and/or years, but do not appreciably break down when held in an oral cavity and exposed to saliva for a period of one hour. In some cases, the mouth-stable polymer is stable within an oral cavity and exposed to saliva at the normal human body temperature for a period of at least 6 hours, at least 12 hours, at least 24 hours, or at least 2 days. Accordingly, the oral products described herein can remain intact when placed within an oral cavity during a use period. After use, the mouth-stable polymer matrix can be removed from the oral cavity and discarded.

The mouth-stable polymer can be a variety of different biocompatible and biostable polymers. In some cases, the mouth-stable polymer is a polymer generally recognized as safe by an appropriate regulatory agency. In some cases, the polymer is a thermoplastic polymer. The polymer can also be a thermoplastic elastomer. For example, suitable mouth-stable polymers include polyurethanes, silicon polymers, polyesters, polyacrylates, polyethylenes, polypropylenes, polyetheramides, polystyrenes (e.g., acrylonitrile butadiene styrene, high impact polystyrenes (HIPS)) polyvinyl alcohols, polyvinyl acetates, polyvinyl chlorides, polybutyl acetates, butyl rubbers (e.g., polyisobutylenes), SEBS, SBS, SIS, and mixtures and copolymers thereof. In some cases, the mouth-stable polymer includes food-grade or medical-grade polymers (e.g., medical-grade polyurethane).

The mouth-stable polymer forms the mouth-stable polymer matrix of the extrudate and the resulting oral products 410 or 410A-L. In some cases, the extrudate includes at least 10 weight percent of one or more mouth-stable polymers. In some cases, the extrudate includes at least 20 weight percent, at least 30 weight percent, at least 40 weight percent, at least 50 weight percent, at least 60 weight percent, at least 70 weight percent, at least 80 weight percent, or at least 90 weight percent of one or more mouth-stable polymers. In some cases, the extrudate includes between 10 and 90 weight percent of one or more mouth-stable polymers. Accordingly to some embodiments, the extrudate includes between 40 and 80 weight percent of the mouth-stable polymers.

The mouth-stable polymer according to certain embodiments has a flexural modulus of at least 5 MPa when tested according to ASTM Testing Method D790 or ISO 178 at 23 degrees Celsius. In some cases, the flexural modulus is at least 10 MPa. For example, the flexural modulus can be between 10 MPa and 30 MPa. In some cases, the mouth-stable polymer is a grade that complies with food-contact regulations applicable in one or more countries (e.g., US FDA regulations). In some cases, the mouth-stable polymer can be a polyurethane, SIS, or other thermal plastic elastomer meeting the requirements of the FDA-modified ISO 10993, Part 1 "Biological Evaluation of Medical Devices" tests with human tissue contact time of 30 days or less. The mouth-stable polymer can have a shore Hardness of 50D or softer, a melt flow index of 3 g/10 min at 200° C./10 kg, a tensile strength of 10 MPa or more (using ISO 37), and a ultimate elongation of less than 100% (using ISO 37).

Additives

A variety of additives can be included in the extrudate. The additives can include alkaloids (e.g., caffeine, nicotine), minerals, vitamins, dietary supplements, nutraceuticals, energizing agents, soothing agents, coloring agents, amino acids, chemesthetic agents, antioxidants, food grade emulsifiers, pH modifiers, botanicals (e.g., green tea), teeth whitening (e.g., SHRIMP), therapeutic agents, sweeteners, flavorants, and combinations thereof. In some cases, the additives include nicotine, sweeteners, and flavorants. In some cases, the nicotine can be tobacco-derived nicotine. With certain combinations of nicotine, sweeteners, and flavorants, the oral product may provide a flavor profile and tactile experience similar to certain tobacco products.

The extrudate can also include one or more antioxidants. Antioxidants can result in a significant reduction in the conversion of nicotine into nicotine-N-oxide when compared to oral products without antioxidants. In some cases, the extrudate can include between 0.01 and 5.00 weight percent antioxidant, between 0.05 and 1.0 weight percent antioxidant, between 0.10 and 0.75 weight percent antioxidant, or between 0.15 and 0.5 weight percent antioxidant. Suitable examples of antioxidants include ascorbyl palmitate (a vitamin C ester), BHT, ascorbic acid (Vitamin C), and sodium ascorbate (Vitamin C salt). In some cases, monosterol citrate, tocopherols, propyl gallate, tertiary butylhydroquinone (TBHQ), butylated hydroxyanisole (BHA), Vitamin E, or a derivative thereof can be used as the antioxidant. For example, ascorbyl palmitate can be the antioxidant in the formulations listed in Table I. Antioxidants can be incorporated into the polymer (e.g., polyurethane) during the extrusion process.

A variety of synthetic and/or natural sweeteners can be in the extrudate. Suitable natural sweeteners include sugars, for example, monosaccharides, disaccharides, and/or polysaccharide sugars, and/or mixtures of two or more sugars. According to some embodiments, the extrudate includes one or more of the following: sucrose or table sugar; honey or a mixture of low molecular weight sugars not including sucrose; glucose or grape sugar or corn sugar or dextrose; molasses; corn sweetener; corn syrup or glucose syrup; fructose or fruit sugar; lactose or milk sugar; maltose or malt sugar or maltobiose; sorghum syrup; mannitol or manna sugar; sorbitol or d-sorbite or d-sorbitol; fruit juice concentrate; and/or mixtures or blends of one or more of these ingredients. The extrudate can also include non-nutritive sweeteners. Suitable non-nutritive sweeteners include: stevia, saccharin; Aspartame; sucralose; or acesulfame potassium.

The extrudate can optionally include one or more flavorants. The flavorants can be natural or artificial. For example, suitable flavorants include wintergreen, cherry and berry type flavorants, various liqueurs and liquors (such as Drambuie, bourbon, scotch, and whiskey) spearmint, peppermint, lavender, cinnamon, cardamom, apium graveolens, clove, cascarilla, nutmeg, sandalwood, bergamot, geranium, honey essence, rose oil, vanilla, lemon oil, orange oil, Japanese mint, cassia, caraway, cognac, jasmine, chamomile, menthol, ylang-ylang, sage, fennel, pimenta, ginger, anise, coriander, coffee, liquorish, and mint oils from a species of the genus Mentha, and encapsulated flavors. Mint oils useful in particular embodiments of the oral product 110 include spearmint and peppermint. Synthetic flavorants can also be used. In some cases, a combination of flavorants can be combined to imitate a tobacco flavor. The particular combination of flavorants can be selected from the flavorants that are generally recognized as safe ("GRAS") in a particular country, such as the United States. Flavorants can also be included in the oral product as encapsulated flavorants.

In some cases, the flavorants in the extrudate are limited to less than 20 weight percent in sum. In some cases, the flavorants in the extrudate are limited to be less than 10 weight percent in sum. For example, certain flavorants can be included in the extrudate in amounts of about 1 weight percent to 5 weight percent.

The extrudate may optionally include other additives. For example, these additives can include non-nicotine alkaloids, dietary minerals, vitamins, dietary supplements, therapeutic agents, and fillers. For example, suitable vitamins include vitamins A, B1, B2, B6, C, D2, D3, E, F, K, and P. For example, an extrudate can include C-vitamins with nicotine. Suitable dietary minerals include calcium (as carbonate, citrate, etc.) or magnesium (as oxide, etc.), chromium (usually as picolinate), and iron (as bis-glycinate). One or more dietary minerals could be included in an extrudate with or without the use of other additives. Other dietary supplements and/or therapeutic agents can also be included as additives.

In some cases, an oral product can be made to include a therapeutic agent that is preferable absorbed transbuccally. For example, so therapeutic agents do not pass into the blood stream if they are swallowed. Exemplary therapeutic agents that can be included in an extrudate provided herein can include Gerd, Buprenorphin, Nitroglycerin, Diclofenac, Fentanyl, Carbamazepine, Galantamine, Acyclovir, Polyamidoamine Nanoparticles, Chlorpheniramine, Testosterone, Estradiol, Progesterone, Calcitonin, Fluorouracil, Naltrexone, Odansetron, Decitabine, Selegiline, Lamotrigine, and Prochlorperazine. For example, an oral product can include Buprenorphine and be used for pain treatment. In some cases, an oral product can include Nitroglycerin and be used for Angina Pectoris treatment. Because of the release properties of the oral product, therapeutic agents included therein can be released at a rate such that a majority of the therapeutic agent is absorbed transbuccally, rather than swallowed.

The extrudate can also include fillers such as starch, di-calcium phosphate, lactose, sorbitol, mannitol, and microcrystalline cellulose, calcium carbonate, dicalcium phosphate, calcium sulfate, clays, silica, glass particles, sodium lauryl sulfate (SLS), glyceryl palmitostearate, sodium benzoate, sodium stearyl fumarate, talc, and stearates (e.g., Mg or K), and waxes (e.g., glycerol monostearate, propylene glycol monostearate, and acetylated monoglycerides), stabilizers (e.g., ascorbic acid and monosterol citrate, BHT, or BHA), disintegrating agents (e.g., starch, sodium starch glycolate, cross caramellose, cross linked PVP), pH stabilizers, or preservatives. In some cases, the amount of filler in the oral product 110 is limited to less than 10 weight percent in sum. In some cases, the amount of filler in the extrudate is limited to be less than 5 weight percent in sum. In some cases, the fillers are mouth stable. In some cases, the fillers can dissolve or disintegrate during use and thus result in an oral product that becomes more pliable during use.

Fibers

The extrudate can include fibers within the mouth-stable polymer matrix. When in the oral product, the fibers can provide passages in the mouth-stable polymer matrix, which can permit certain additives within the polymer matrix to be released into an oral cavity when the oral product is received in an oral cavity and exposed to saliva. The fibers can be cellulosic fibers. The cellulosic fibers can be derived from plant tissue. In some cases, the cellulosic fibers include cellulose. The cellulosic fibers can further include lignin and/or lipids. Suitable sources for cellulosic fibers include wood pulp, cotton, sugar beets, bran, citrus pulp fiber, switch grass and other grasses, Salix (willow), tea, and Populus (poplar). In some cases, the cellulosic fibers can be chopped or shredded plant tissue comprising various natural flavors, sweeteners, or active ingredients. In some cases, the oral product 110 can include nicotine as an additive (optionally with additional sweeteners and flavors) and non-tobacco cellulosic fiber, and thus be substantially free of tobacco plant tissue.

The cellulosic fibers can have a variety of dimensions. The dimensions of the fibers (in addition to the amount) can impact the release characteristics of the additives. For example, cellulosic fibers can be hydrophilic, thus water soluble additives (e.g., nicotine) can preferentially be absorbed in fiber-polymer matrix. The release profile of nicotine from a polyurethane oral product can be impacted by both the fiber sizes and the amounts of fiber. In some cases, the cellulosic fiber can be processed to have an average fiber size of less than 200 micrometers. In particular embodiments, the fibers are between 75 and 125 micrometers. In some cases, the fibers are processed to have a size of 75 micrometers or less. In some cases, an oral product can include between 5 weight percent and 50 weight percent fiber.

The extrudate can also include soluble fibers. The soluble fibers can be adapted to dissolve when exposed to saliva when the oral product is received in an oral cavity. In some cases, the soluble fiber can be a maltodextrin. The maltodextrin can be derived from corn. For example, Soluble Dietary Fiber can be included in an extrudate. Soluble fibers can be used alone or with cellulosic fibers to provide channels for additives to be released from the oral product. As the soluble fibers dissolve, the oral product can become more flexible and the additional channels can open up to permit the release of additional additive deposits. Suitable soluble fibers include psyllium fibers. In some cases, the fibers can be partially soluble. For example, sugar beet fibers can partially dissolve during use.

In some cases, an oral product 110 can include a combination of soluble and insoluble fibers. The ratio of soluble to insoluble fiber can impact the softness of texture of the oral product. The ratio of soluble to insoluble fiber can also impact the compressibility of the oral product. In some cases, a ratio of soluble to insoluble fiber is between 1:60 and 60:1. In some cases, the ratio of soluble to insoluble fiber is greater than 1:50, greater than 1:40, greater than 1:30, greater than 1:20, greater than 1:10, or greater than 1:5. In some cases, the ratio of soluble to insoluble fiber is less than 1:1, less than 1:2, less than 1:5, less than 1:10, less than 1:20, or less that 1:30. In some cases, an oral product having a mixture of soluble and insoluble fibers can have a percentage of compression @ 250N of between 60 percent and 98 percent, between 65 percent and 95 percent, between 70 percent and 90 percent, or between 80 and 89 percent.

Plasticizers

The extrudate can also include one or more plasticizers. Plasticizers can soften the final oral product and thus increase its flexibility. Plasticizers work by embedding themselves between the chains of polymers, spacing them apart (increasing the "free volume"), and thus significantly lowering the glass transition temperature for the plastic and making it softer. Suitable plasticizers include propylene glycol, glycerin, vegetable oil, and medium chain triglycerides. In some cases, the plasticizer can include phthalates. Esters of polycarboxylic acids with linear or branched aliphatic alcohols of moderate chain length can also be used as plasticizers. Moreover, plasticizers can facilitate the extrusion processes described below. In some cases, the extrudate can include up to 20 weight percent plasticizer. In some cases, the extrudate includes between 0.5 and 10 weight percent plasticizer, the extrudate can include between 1 and 8 weight percent plasticizer, or between 2 and 4 weight percent plasticizer. For example, an oral product comprising a polyurethane polymer matrix and include about 3 to 6.5 weight percent of propylene glycol.

OTHER EMBODIMENTS

It is to be understood that, while the invention has been described herein in conjunction with a number of different aspects, the foregoing description of the various aspects is intended to illustrate and not limit the scope of the invention, which is defined by the scope of the appended claims. Other aspects, advantages, and modifications are within the scope of the following claims.

Disclosed are methods and compositions that can be used for, can be used in conjunction with, can be used in preparation for, or are products of the disclosed methods and compositions. These and other materials are disclosed herein, and it is understood that combinations, subsets, interactions, groups, etc. of these methods and compositions are disclosed. That is, while specific reference to each various individual and collective combinations and permutations of these compositions and methods may not be explicitly disclosed, each is specifically contemplated and described herein. For example, if a particular composition of matter or a particular method is disclosed and discussed and a number of compositions or methods are discussed, each and every combination and permutation of the compositions and the methods are specifically contemplated unless specifically indicated to the contrary. Likewise, any subset or combination of these is also specifically contemplated and disclosed.

What is claimed is:

1. A method of forming a plurality of oral products, the method comprising:
   a. gripping a rod including polymer with a gripping device, the gripping device being configured to align, hold, and index the rod, the gripping device including two gripping rollers configured to grip opposite sides of the rod, and two gripping surfaces configured to selectively engage and disengage the rod;
   b. indexing the rod forward with the gripping device so that a leading end of the rod abuts a stop at a first stop location;
   c. cutting a leading portion of the rod with a cutting device to separate an oral product of the plurality of oral products from a remainder of the rod;
   d. pivoting the stop about a pivot from the first stop location to a second stop location to allow the oral product to fall onto a load cell, the stop being spaced from the cutting device;
   e. moving the stop from the second stop location to the first stop location; and
   f. repeating steps (b)-(e).

2. The method of claim 1, further comprising:
releasing the rod from the two gripping surfaces after the cutting; and
gripping the rod with the two gripping surfaces again before the repeating.

3. The method of claim 2, wherein
the releasing and the pivoting are performed concurrently.

4. The method of claim 2, wherein
the indexing the rod includes indexing the two gripping surfaces between a first gripping location and a second gripping location.

5. The method of claim 1, wherein
the indexing includes rotating the two gripping rollers.

6. The method of claim 1, further comprising:
weighing one or more oral products using the load cell to determine whether the one or more oral products are within a weight range.

7. The method of claim 6, further comprising:
adjusting the first stop location based on a weight or weights of the one or more oral products.

8. The method of claim 6, further comprising:
moving oral products that are within the weight range to a collection location; and
moving oral products that are outside of the weight range to a discard location.

9. The method of claim 8, wherein the moving oral products to the collection location and the moving oral products to the discard location include directing air towards the oral products.

10. The method of claim 1, wherein the cutting does not significantly alter a cross-sectional shape of the oral products from that of the rod.

11. The method of claim 1, wherein the rod has a temperature of less than 50° C.

12. The method of claim 1, wherein the rod further includes an additive.

13. The method of claim 12, wherein the polymer includes polyurethane, and the additive includes cellulosic fibers, nicotine, a sweetener, a flavorant, or any combination thereof.

14. A machine for forming a plurality of oral products, the machine comprising:
a cutting device configured to cut through a rod to separate an oral product from a remainder of the rod, the rod including a polymer;
a stop spaced from the cutting device, the stop being pivotable about a pivot from a first stop location to a second stop location, the stop being configured to abut the rod;
a gripping device to align, hold, and index the rod towards the stop, the gripping device including,
   two gripping rollers configured to grip opposite sides of the rod, and
   two gripping surfaces configured to selectively engage and disengage the rod; and
a load cell configured to receive the oral product separated from the remainder the rod.

15. The machine of claim 14, wherein the first stop location adjustable.

16. The machine of claim 14, further comprising:
a programmable logic controller configured to sequence and control an operation of the machine to grip the rod with the gripping device, index the rod to have a leading end of the rod abut the stop at the first stop location, cut the leading end of the rod to separate the oral product from the rod, move the stop from the first stop location to the second stop location to allow the oral product to drop to the load cell, and weigh the oral product using the load cell.

17. The machine of claim 16, wherein the programmable logic controller is further configured to (a) determine if the oral product is within a predetermined weight range, (b) transfer the oral product to one of a collection location or a discard location based on a detected weight, (c) adjust the first stop location step-based on the detected weight of the oral product, or (d) any combination thereof.

18. The machine of claim 14, further comprising:
an infeed tray configured to support the rod.

19. The machine of claim 14, wherein the gripping device further includes, an actuator configured to index the two gripping surfaces between a first gripping location and a second gripping location.

20. The machine of claim 14, wherein the two gripping rollers are configured to intermittently rotate so as to index the rod.

21. The machine of claim 14, wherein the cutting device includes a blade, a blade holder, a blade holder guide, and a blade actuator.

22. The machine of claim 14, further comprising:
an actuator configured to pivot the stop between the first stop location and the second stop location.

23. The machine of claim 14, further comprising:
an air nozzle system configured to blow the oral product off the load cell.

24. The machine of claim 14, wherein
the load cell includes a wheel having a plurality of spaced through bores,
the oral product is configured to fall into a through bore of the plurality of spaced through bores after being cut.

25. The machine of claim 19, wherein
the two gripping surfaces are configured to engage the rod while moving from the first gripping location to the second gripping location, thereby indexing the rod toward the stop, and
the two gripping surfaces are configured to disengage the rod while moving from the second gripping location to the first gripping location.

26. The machine of claim 14, wherein the cutting device is configured to cut through an unsupported portion of the rod to separate the oral product from the remainder of the rod.

27. The machine of claim 26, further comprising:
a drop tube disposed directly below the cutting device and configured to receive the oral product and direct the oral product to the load cell.

* * * * *